(12) United States Patent
Smith et al.

(10) Patent No.: US 10,704,597 B2
(45) Date of Patent: Jul. 7, 2020

(54) AXLE ASSEMBLY HAVING A BEARING PRELOAD MODULE

(71) Applicant: ArvinMeritor Technology, LLC, Troy, MI (US)

(72) Inventors: Mark Smith, Troy, MI (US); Angel Begov, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 16/205,771

(22) Filed: Nov. 30, 2018

(65) Prior Publication Data

US 2020/0173494 A1 Jun. 4, 2020

(51) Int. Cl.

| | |
|---|---|
| *F16C 19/18* | (2006.01) |
| *F16C 35/04* | (2006.01) |
| *F16C 35/077* | (2006.01) |
| *H02K 7/08* | (2006.01) |
| *F01D 25/16* | (2006.01) |
| *H02K 7/116* | (2006.01) |
| *F16C 25/08* | (2006.01) |
| *F16C 35/06* | (2006.01) |
| *F16H 57/02* | (2012.01) |
| *F16H 57/037* | (2012.01) |

(52) U.S. Cl.
CPC .............. *F16C 25/08* (2013.01); *F01D 25/16* (2013.01); *F16C 19/18* (2013.01); *F16C 35/042* (2013.01); *F16C 35/06* (2013.01); *F16C 35/077* (2013.01); *H02K 7/08* (2013.01); *H02K 7/116* (2013.01); *F16C 2380/26* (2013.01); *F16H 57/037* (2013.01); *F16H 2057/02034* (2013.01); *F16H 2057/02052* (2013.01); *H02K 2213/09* (2013.01)

(58) Field of Classification Search
CPC ........ F16C 19/18; F16C 19/546; F16C 25/08; F16C 35/042; F16C 35/06; F16C 35/077; F16C 2057/02034; F16C 2380/26; H02K 7/08; H02K 7/116; H02K 15/16; H02K 2213/09; F16H 57/037; F16H 2057/02052; F01D 25/16
USPC ..... 384/504, 517, 520, 558, 563; 475/5, 150
See application file for complete search history.

(56) References Cited

U.S. PATENT DOCUMENTS 2,338,154 A 1/1944 Wilkinson
4,304,152 A 12/1981 Michling
(Continued)

FOREIGN PATENT DOCUMENTS

DE 2005047 A1 8/1971
DE 3036465 A1 5/1982
(Continued)

OTHER PUBLICATIONS

Pedro Garcia, et al., U.S. Appl. No. 15/680,436, filed with the United States Patent and Trademark Office Aug. 18, 2017.
(Continued)

*Primary Examiner* — Marcus Charles
(74) *Attorney, Agent, or Firm* — Brooks Kushman PC

(57) ABSTRACT

An axle assembly having a rotor bearing preload module. The rotor bearing preload module may be disposed between a first and second rotor bearing assemblies. The rotor bearing preload module may include a biasing member that may bias the first rotor bearing assembly away from the second rotor bearing assembly.

22 Claims, 26 Drawing Sheets

(56) References Cited

U.S. PATENT DOCUMENTS

| | | | |
|---|---|---|---|
| 4,676,667 A * | 6/1987 | Komatsu | F01D 25/16 384/517 |
| 5,603,671 A | 2/1997 | Schmidt | |
| 6,126,207 A * | 10/2000 | Ives | F16L 39/04 285/121.1 |
| 6,216,560 B1 | 4/2001 | Takada et al. | |
| 7,316,627 B2 * | 1/2008 | Bennett | B60K 17/043 475/149 |
| 7,455,612 B2 * | 11/2008 | Teraoka | B60K 17/34 180/65.6 |
| 7,517,154 B2 * | 4/2009 | McKeiman, Jr. | F01D 25/16 384/517 |
| 7,530,912 B2 | 5/2009 | Kramer | |
| 8,858,379 B2 | 10/2014 | Keeney et al. | |
| 9,022,890 B2 * | 5/2015 | Smetana | F16D 3/06 475/149 |
| 9,033,107 B2 * | 5/2015 | Schneider | F04C 2/3445 184/6.12 |
| 2003/0125150 A1 | 7/2003 | Tanzer | |
| 2005/0124450 A1 | 6/2005 | Gady et al. | |
| 2005/0176543 A1 | 8/2005 | Kirkwood et al. | |
| 2005/0187058 A1 | 8/2005 | Teraoka | |
| 2006/0094552 A1 | 5/2006 | Duncan | |
| 2007/0275816 A1 | 11/2007 | Henderson | |
| 2008/0146396 A1 | 6/2008 | Millar | |
| 2008/0174190 A1 * | 7/2008 | Kurata | H02K 1/18 310/54 |
| 2009/0121570 A1 | 5/2009 | Nishikawa et al. | |
| 2010/0000807 A1 | 1/2010 | Rodriguez et al. | |
| 2010/0180720 A1 * | 7/2010 | Kempf | B60K 6/405 74/606 R |
| 2011/0290071 A1 * | 12/2011 | Giessner | B60K 6/405 74/640 |
| 2012/0238387 A1 | 9/2012 | Stuart | |
| 2013/0005526 A1 | 1/2013 | Matsubara et al. | |
| 2013/0017927 A1 | 1/2013 | Morscheck et al. | |
| 2013/0296094 A1 * | 11/2013 | Mack | B60L 50/16 475/150 |
| 2014/0009041 A1 | 1/2014 | Kawasaki et al. | |
| 2014/0087906 A1 | 3/2014 | Keeney et al. | |
| 2014/0128192 A1 * | 5/2014 | Korenaga | F16H 1/32 475/5 |
| 2014/0141918 A1 * | 5/2014 | Fukami | B60K 1/00 475/150 |
| 2014/0262675 A1 | 9/2014 | Sugiyama et al. | |
| 2014/0274529 A1 | 9/2014 | Edler et al. | |
| 2015/0151634 A1 | 6/2015 | Smetana | |
| 2015/0330492 A1 | 11/2015 | Lee et al. | |
| 2016/0053880 A1 | 2/2016 | Peura | |
| 2016/0355084 A1 * | 12/2016 | Uozumi | H02K 7/006 |
| 2017/0001513 A1 | 1/2017 | Kuroda et al. | |
| 2017/0057349 A1 | 3/2017 | Ogawa et al. | |
| 2018/0109222 A1 * | 4/2018 | Suzuki | H02P 29/60 |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |

FOREIGN PATENT DOCUMENTS

| | | | |
|---|---|---|---|
| DE | 4120262 A1 | 5/1992 | |
| DE | 19827756 A1 | 12/1999 | |
| DE | 19915926 A1 | 3/2000 | |
| DE | 19952625 A1 | 6/2001 | |
| DE | 10049197 A1 | 4/2002 | |
| DE | 10226572 A1 | 1/2004 | |
| DE | 102004038882 A1 | 3/2005 | |
| DE | 102010061217 A1 | 6/2012 | |
| DE | 102011007253 A1 * | 10/2012 | F16D 3/06 |
| DE | 102011007257 A1 | 10/2012 | |
| DE | 102011007268 A1 | 10/2012 | |
| EP | 0677414 A2 | 10/1995 | |
| EP | 2444265 A1 | 4/2012 | |
| EP | 2905879 A1 | 8/2015 | |
| JP | S57059124 U | 4/1982 | |
| JP | 2004185207 A | 7/1992 | |
| JP | 2003019911 A | 1/2003 | |
| WO | 2013029682 A1 | 3/2013 | |
| WO | 2016132800 A1 | 8/2016 | |
| WO | 2017114423 A1 | 7/2017 | |

OTHER PUBLICATIONS

Pedro Garcia, et al., U.S. Appl. No. 15/680,468, filed with the United States Patent and Trademark Office Aug. 18, 2017.

Pedro Garcia, et al., U.S. Appl. No. 15/680,559, filed with the United States Patent and Trademark Office Aug. 18, 2017.

Dhanapal Vittala Raya, et al., U.S. Appl. No. 16/205,586, filed with the United States Patent and Trademark Office Nov. 30, 2018.

Mark Smith, et al., U.S. Appl. No. 16/205,623, filed with the United States Patent and Trademark Office Nov. 30, 2018.

Mark Smith, et al., U.S. Appl. No. 16/206,182, filed with the United States Patent and Trademark Office Nov. 30, 2018.

Rodrigo Soffner, et al., U.S. Appl. 16/205,663, filed with the United States Patent and Trademark Office Nov. 30, 2018.

Angel Begov, et al., U.S. Appl. No. 16/205,717, filed with the United States Patent and Trademark Office Nov. 30, 2018.

Tao Peng, et al., U.S. Appl. No. 16/205,850, filed with the United States Patent and Trademark Office Nov. 30, 2018.

Extended European Search Report dated Apr. 7, 2020, for related European Appln. No. 19211013.8; 7 Pages.

* cited by examiner

US 10,704,597 B2

AXLE ASSEMBLY HAVING A BEARING PRELOAD MODULE

TECHNICAL FIELD

This disclosure relates to an axle assembly that may have a bearing preload module.

BACKGROUND

An axle assembly having an electric motor module is disclosed in U.S. Pat. No. 8,858,379.

SUMMARY

In at least one embodiment, an axle assembly is provided. The axle assembly may include a differential carrier, a rotor, a first rotor bearing assembly, a second rotor bearing assembly, and a rotor bearing preload module. The rotor may be rotatable about an axis with respect to the differential carrier. The first and second rotor bearing assemblies may be disposed on the differential carrier and may rotatably support the rotor. The rotor bearing preload module may be disposed between the first and second rotor bearing assemblies. The rotor bearing preload module may include a biasing member that may bias the first rotor bearing assembly away from the second rotor bearing assembly.

In at least one embodiment, an axle assembly is provided. The axle assembly may include a differential carrier, a rotor, a first rotor bearing assembly, a second rotor bearing assembly, and a rotor bearing preload module. The rotor may be rotatable about an axis with respect to the differential carrier. The first and second rotor bearing assemblies may receive the differential carrier and may rotatably support the rotor. The rotor bearing preload module may be disposed between the first and second rotor bearing assemblies. The rotor bearing preload module may include a first bearing preload ring, a second bearing preload ring, and a biasing member. The first bearing preload ring may extend from the first rotor bearing assembly and may be movable in an axial direction. The second bearing preload ring may extend from the second rotor bearing assembly. The biasing member may be disposed between the first and second bearing preload rings and may bias the first rotor bearing assembly away from the second rotor bearing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
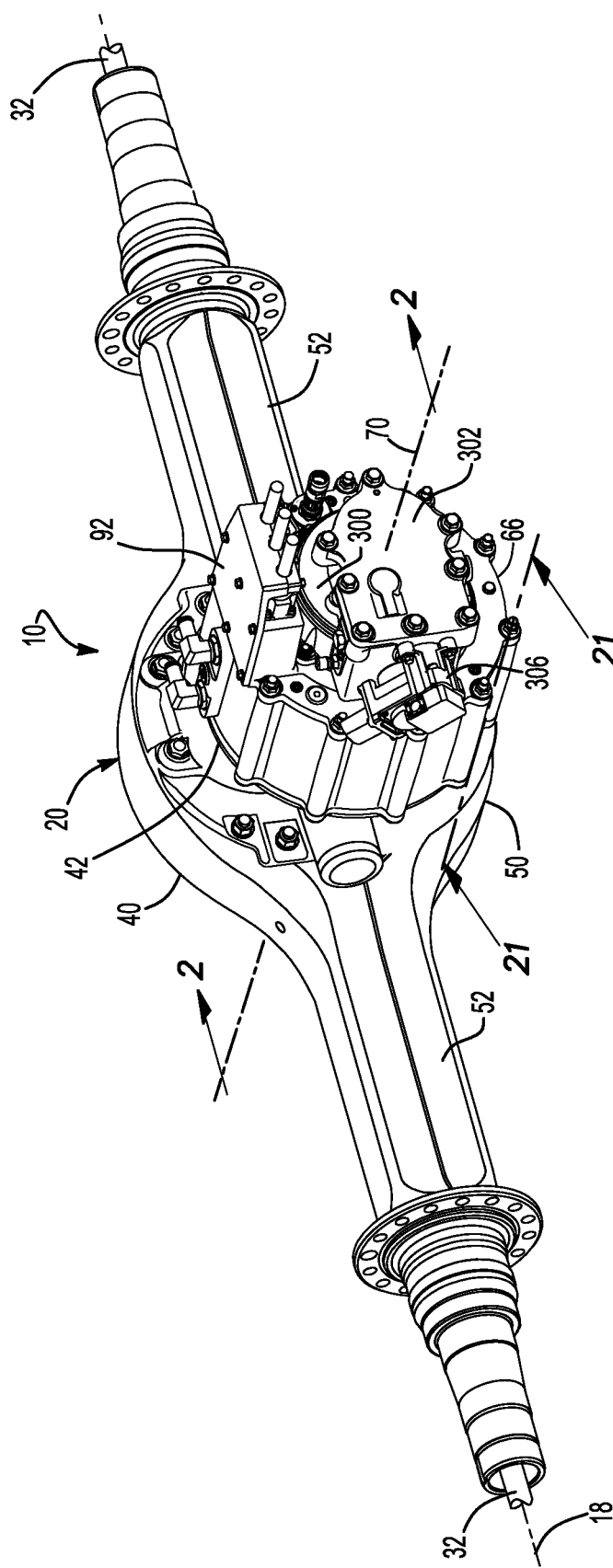
FIG. 1 is a perspective view of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

Figure 23:
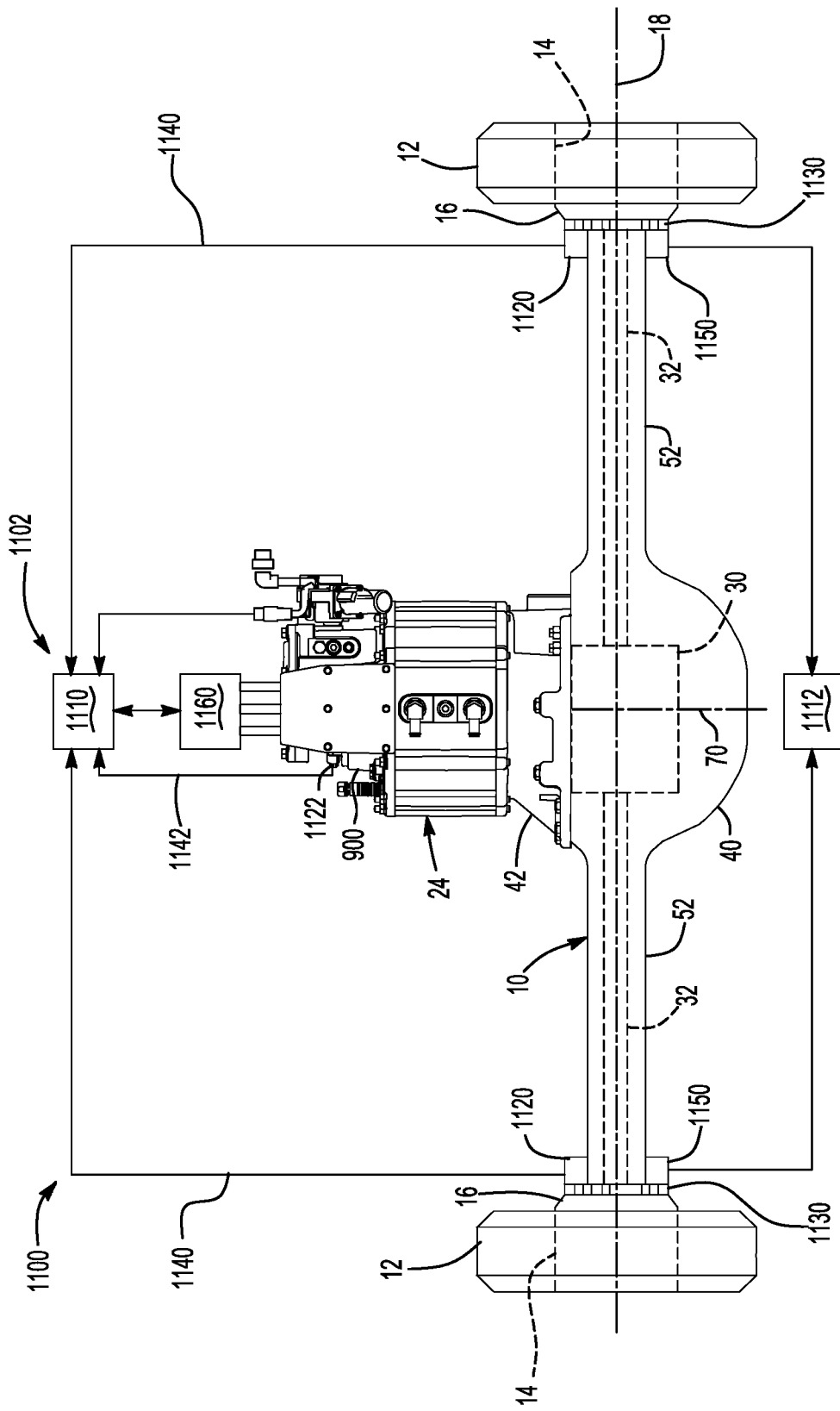
FIG. 23 is a schematic representation of the axle system that includes the axle assembly and a control system.

Referring to FIGS. 1 and 23, the axle assembly 10 may provide torque to one or more traction wheel assemblies that may include a tire 12 mounted on a wheel 14. The wheel 14 may be mounted to a wheel hub 16 that may be rotatable about a wheel axis 18.

One or more axle assemblies may be provided with the vehicle. As is best shown with reference to FIGS. 1 and 2, the axle assembly 10 may include a housing assembly 20, a drive pinion 22, an electric motor module 24, a gear reduction module 26, a shift mechanism 28, a differential assembly 30, and at least one axle shaft 32.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 32. In at least one embodiment, the axle housing 40 may include a center portion 50 and at least one arm portion 52.

Figure 2:
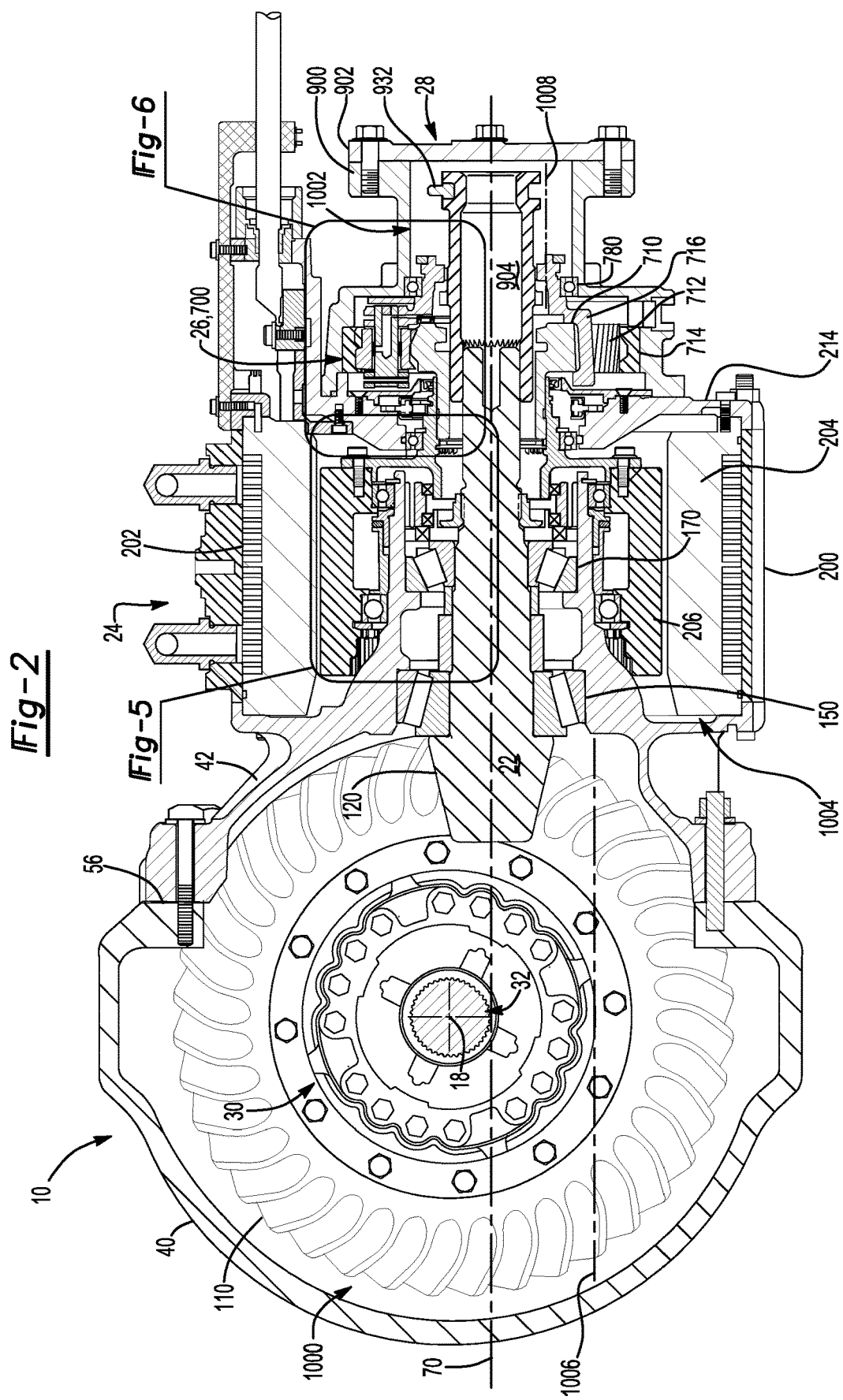
FIG. 2 is a section view of the axle assembly along section line 2-2 showing a shift collar in a first position.

The center portion 50 may be disposed proximate the center of the axle housing 40. The center portion 50 may define a cavity that may receive the differential assembly 30. As is best shown in FIG. 2, a lower region of the center portion 50 may at least partially define a sump portion that may contain a first lubricant. Splashed lubricant may flow down the sides of the center portion 50 and may flow over various internal components of the axle assembly 10 and gather in the sump portion. The sump portion may be part of a first lubricant chamber as will be discussed in more detail below.

The center portion 50 may include a carrier mounting surface 56. The carrier mounting surface 56 may facilitate mounting of the differential carrier 42 to the axle housing 40. For example, the carrier mounting surface 56 may face toward and may engage the differential carrier 42 and may have a set of holes that may be aligned with corresponding holes on the differential carrier 42. Each hole may receive a fastener, such as a bolt, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 30. The arm portions 52 may have substantially similar configurations. For example, the arm portions 52 may each have a hollow configuration or tubular configuration that may extend around and may receive a corresponding axle shaft 32 and may help separate or isolate the axle shaft 32 or a portion thereof from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. An arm portion may rotatably support an associated wheel hub 16. It is also contemplated that the arm portions 52 may be omitted.

Referring to FIGS. 1 and 2, the differential carrier 42, which may also be called a carrier housing, may be mounted to the center portion 50 of the axle housing 40. The differential carrier 42 may support the differential assembly 30 and may facilitate mounting of the electric motor module 24. As is best shown with reference to FIGS. 2, 7 and 14, the differential carrier 42 may include one or more bearing supports 60, a mounting flange 62, and a bearing support wall 64.

Figure 7:
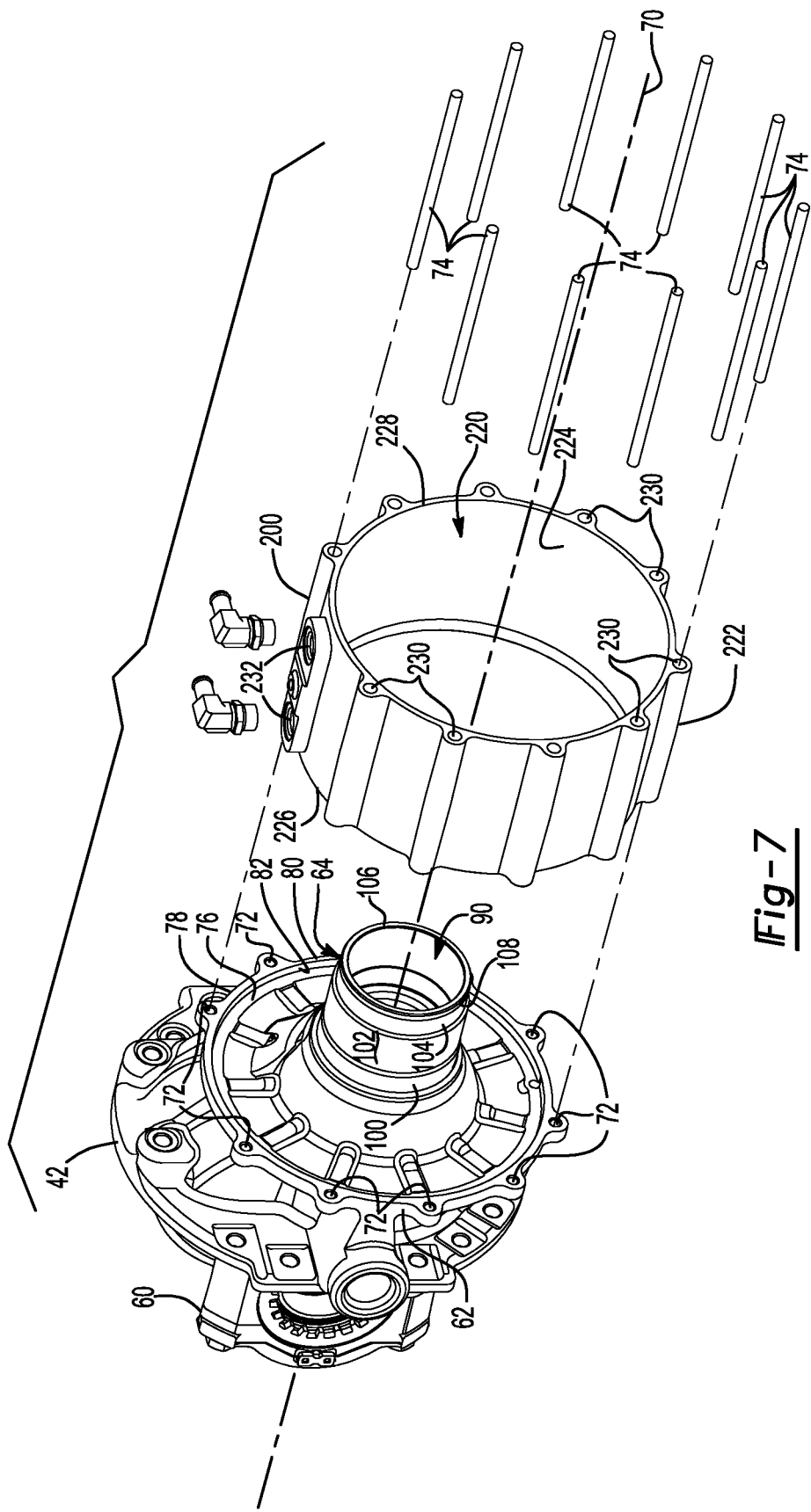
FIGS. 7-20 are exploded views of the axle assembly.
Figure 14:
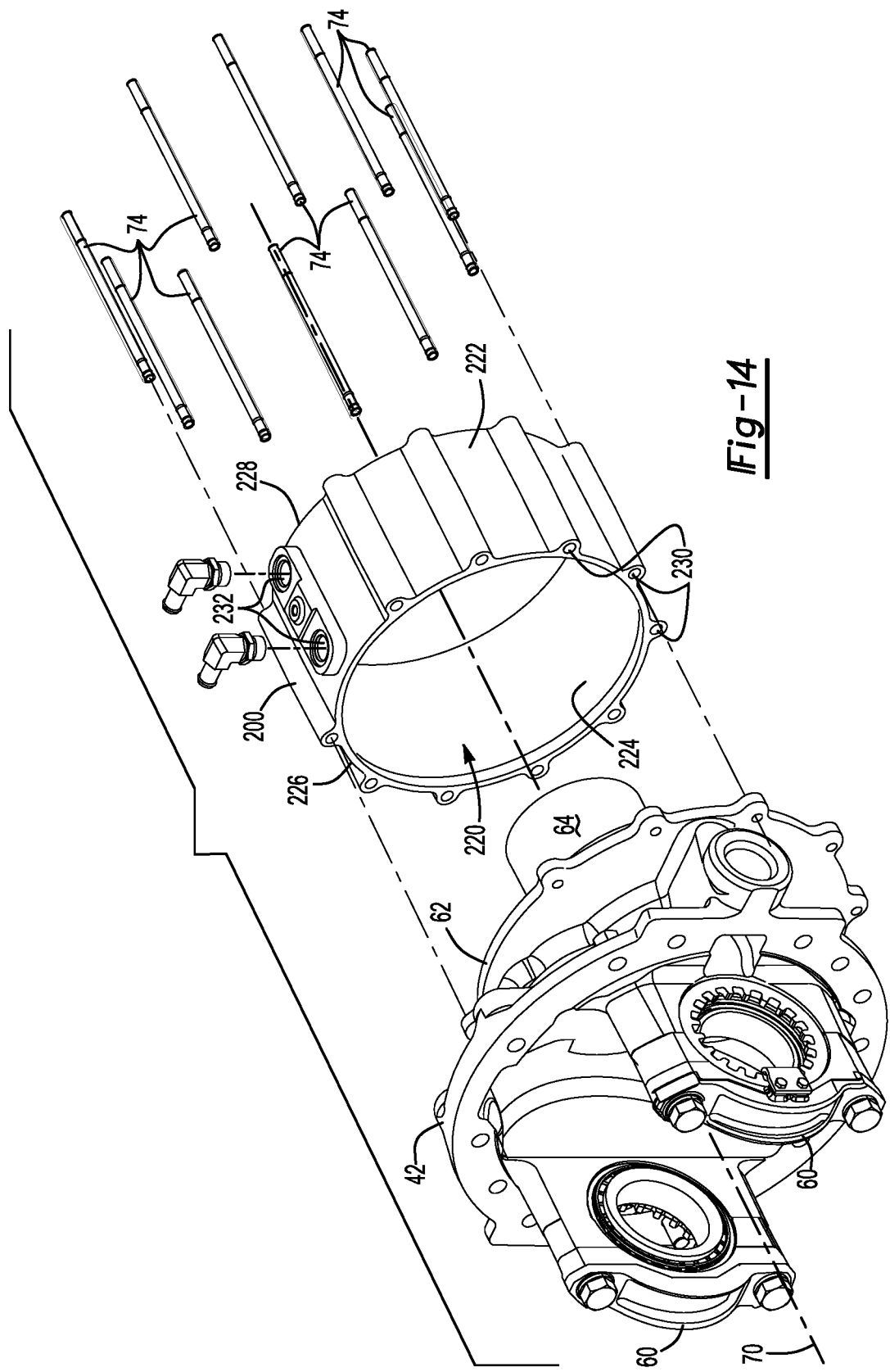

Referring to FIGS. 7 and 14, the bearing support 60 may support a roller bearing assembly that may rotatably support the differential assembly 30. For example, two bearing supports 60 may be received in the center portion 50 and may be located proximate opposite sides of the differential assembly 30. The bearing support 60 may be provided in various configurations. For example, a bearing support 60 may include a pair of legs that extend from the differential carrier 42. A bearing cap may be mounted to the legs and may arch over a roller bearing assembly that may rotatably support the differential assembly 30. As another example, the bearing support 60 may be received in a roller bearing assembly which in turn may support the differential assembly 30.

The mounting flange 62 may facilitate mounting of the electric motor module 24. The mounting flange 62 may be configured as a ring that may extend outward and away from a first axis 70 and may extend around the first axis 70. The mounting flange 62 may include a set of fastener holes 72. The fastener holes 72 may be spaced apart from each other and may be threaded in one or more configurations. Each fastener hole 72 may be configured to receive a fastener 74 that may secure the electric motor module 24 to the mounting flange 62 as will be discussed in more detail below. In at least one configuration, the mounting flange 62 may include an abutment surface 76 and a locating ring 78.

Figure 3:
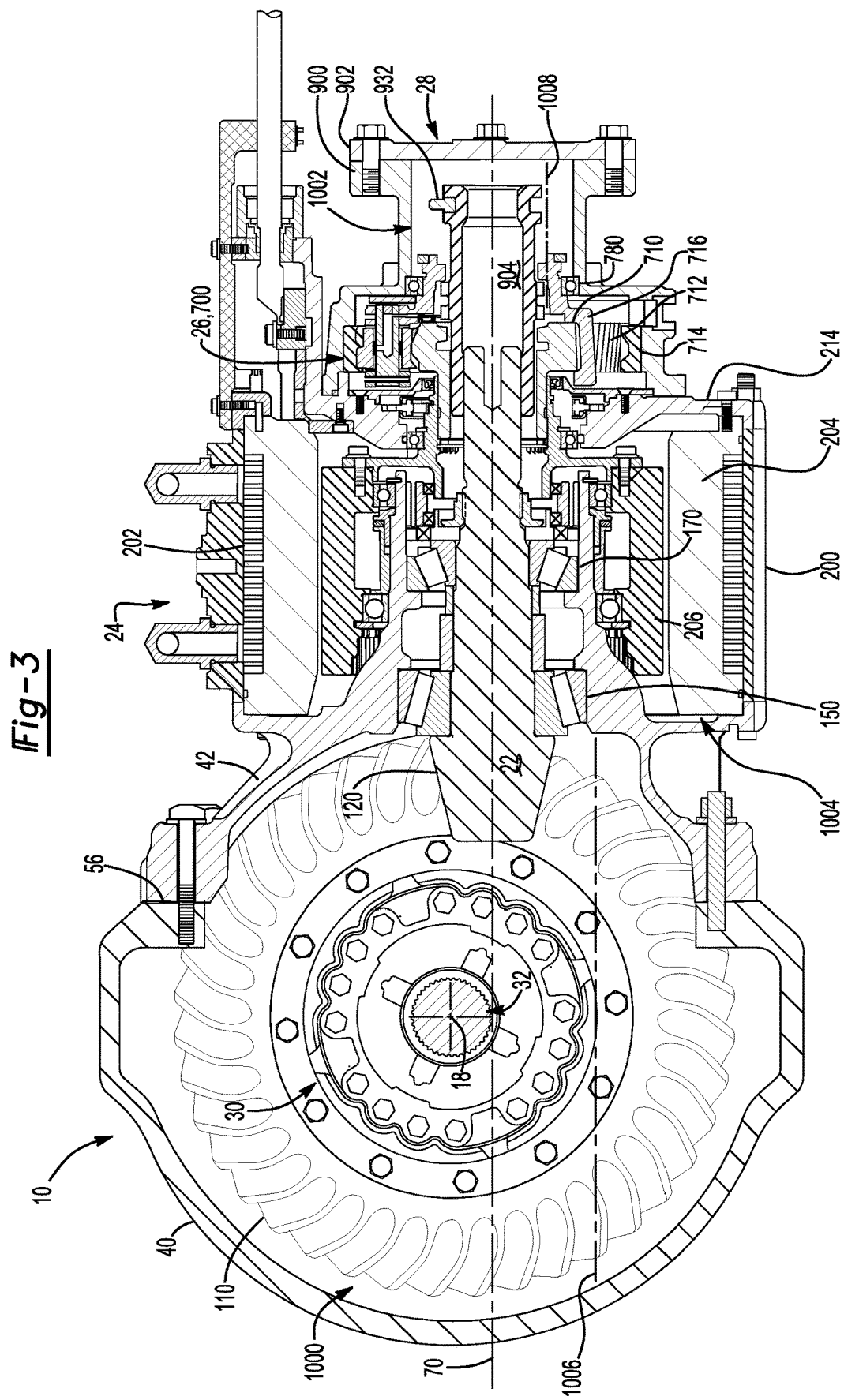
FIG. 3 is a section view of the axle assembly showing the shift collar in a second position.

The abutment surface 76 may face toward the electric motor module 24, or to the right from the perspective shown in FIG. 3. In at least one configuration, the abutment surface 76 may be disposed substantially perpendicular to the first axis 70. The abutment surface 76 may be disposed closer to the first axis 70 than the locating ring 78.

The locating ring 78 may be configured to receive a portion of the electric motor module 24 as will be discussed in more detail below. The locating ring 78 may extend around the first axis 70 and may protrude from the abutment surface 76. For instance, the locating ring 78 may extend in an axial direction that may extend away from the axle housing 40. The locating ring 78 may include or define a ring end surface 80 and an inner ring surface 82.

The ring end surface 80 may be axially offset from the abutment surface 76. For example, the ring end surface 80 may be disposed further from the axle housing 40 than the abutment surface 76. In at least one configuration, the ring end surface 80 may be disposed substantially perpendicular to the first axis 70 and may be configured to engage a motor housing of the electric motor module 24 as will be discussed in more detail below.

The inner ring surface 82 may extend from the abutment surface 76 to the ring end surface 80. For instance, the inner ring surface 82 may extend from the abutment surface 76 to an end of the ring end surface 80. The inner ring surface 82 may face toward the first axis 70 and may extend around and may receive at least a portion of a coolant jacket of the electric motor module 24 as will be discussed in more detail below.

Referring to FIGS. 2 and 7, the bearing support wall 64 may support bearings that may rotatably support other components of the axle assembly 10. For example, the bearing support wall 64 may support bearings that may rotatably support the drive pinion 22, bearings that may rotatably support a rotor of the electric motor module 24, or both. The bearing support wall 64 may extend in an axial direction away from the axle housing 40 and may extend around the first axis 70. As such, the bearing support wall 64 may define a hole 90 that may receive the drive pinion 22 and various other components as will be discussed in more detail below. In addition, the bearing support wall 64 may be radially positioned between the first axis 70 and the electric motor module 24. The bearing support wall 64 may be integrally formed with the differential carrier 42 or may be a separate component that is fastened to the differential carrier 42.

Figure 5:
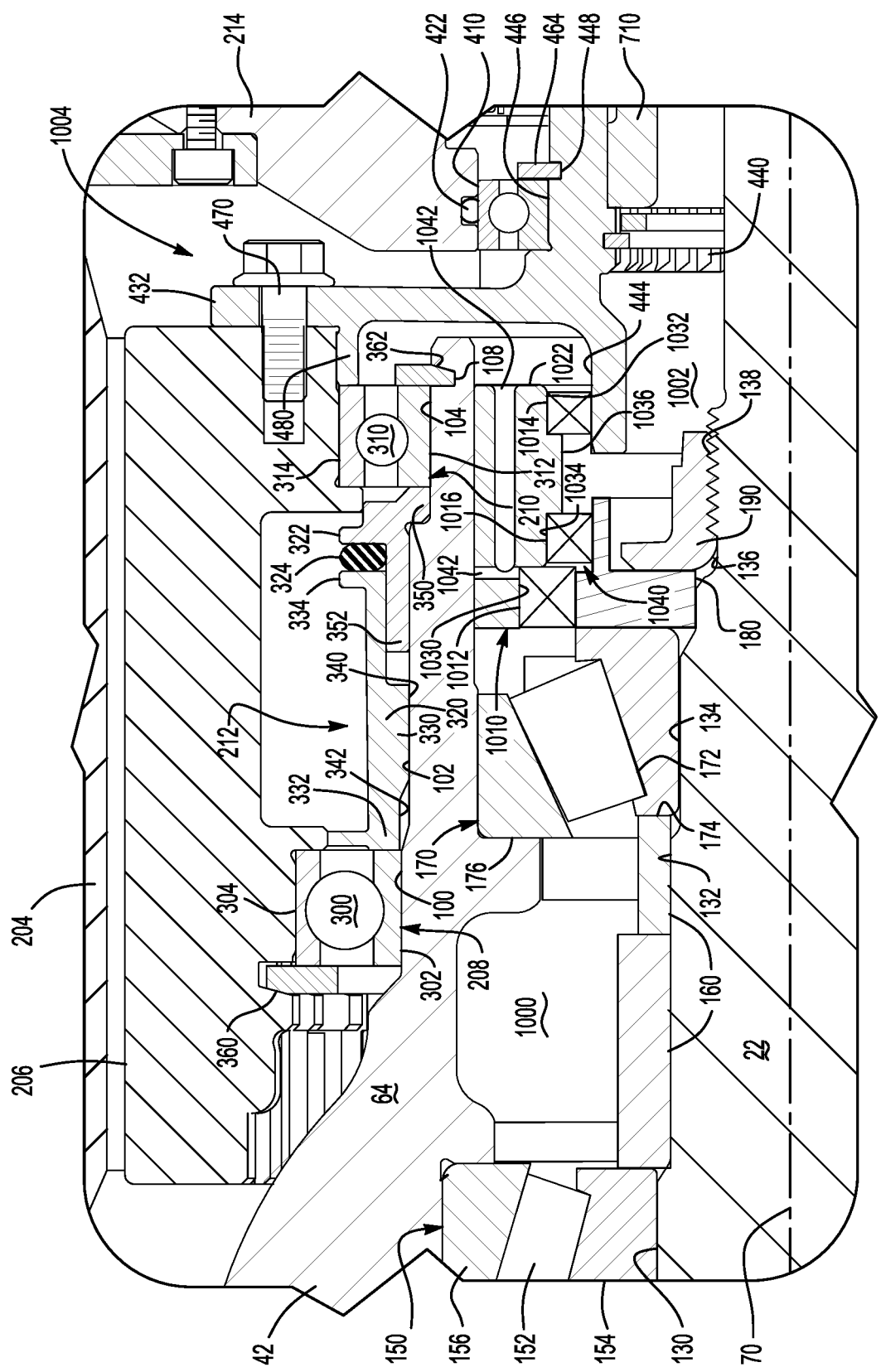
FIG. 5 is a magnified view of a portion of FIG. 2

Referring to FIGS. 5 and 7, the exterior side of the bearing support wall 64 that faces away from the first axis 70 may have a stepped configuration that may generally become narrower as the distance from the axle housing 40 increases. Such a configuration may include a first circumferential surface 100, a second circumferential surface 102, and a third circumferential surface 104.

The first circumferential surface 100 may extend around the first axis 70 and may face away from the first axis 70. The first circumferential surface 100 may support a first rotor bearing assembly as will be discussed in more detail below.

The second circumferential surface 102 may be axially positioned between the first circumferential surface 100 and the third circumferential surface 104. The second circumferential surface 102 may have a smaller diameter than the first circumferential surface 100.

The third circumferential surface 104 may be axially positioned between the second circumferential surface 102 and an end surface 106 of the bearing support wall 64. The third circumferential surface 104 may have a smaller diameter than the second circumferential surface 102. The third circumferential surface 104 may support a second rotor bearing assembly as will be discussed in more detail below.

A groove 108 may be provided in the third circumferential surface 104. The groove 108 may extend toward the first axis 70 and may be axially positioned between the second circumferential surface 102 and the end surface 106. The groove 108 may receive a retainer, such as a snap ring, as will be discussed in more detail below.

Drive Pinion

Referring to FIG. 2, the drive pinion 22 may provide torque to a ring gear 110 that may be provided with the differential assembly 30. Moreover, in an axle assembly that includes a gear reduction module 26, the drive pinion 22 may operatively connect a planetary gear set of the gear reduction module 26 to the differential assembly 30. The drive pinion 22 may extend along and may be rotatable about the first axis 70 while the ring gear 110 may be rotatable about the wheel axis 18. In addition, the drive pinion 22 may extend through the hole 90 in the bearing support wall 64 and through a hole in a motor cover as will be discussed in more detail below. In at least one configuration, such as is best shown with reference to FIGS. 2, 9 and 16, the drive pinion 22 may include a gear portion 120 and a shaft portion 122.

The gear portion 120 may be disposed at or near an end of the shaft portion 122. The gear portion 120 may have a plurality of teeth that may mate with corresponding teeth on the ring gear 110. The gear portion 120 may be integrally formed with the shaft portion 122 or may be provided as a separate component that may be fixedly disposed on the shaft portion 122.

The shaft portion 122 may extend from the gear portion 120 in a direction that extends away from the axle housing 40. As is best shown with reference to FIGS. 9 and 16, the shaft portion 122 may include a first outer surface 130, a second outer surface 132, a third outer surface 134, a fourth outer surface 136, a threaded portion 138, and a spline 140.

Figure 9:
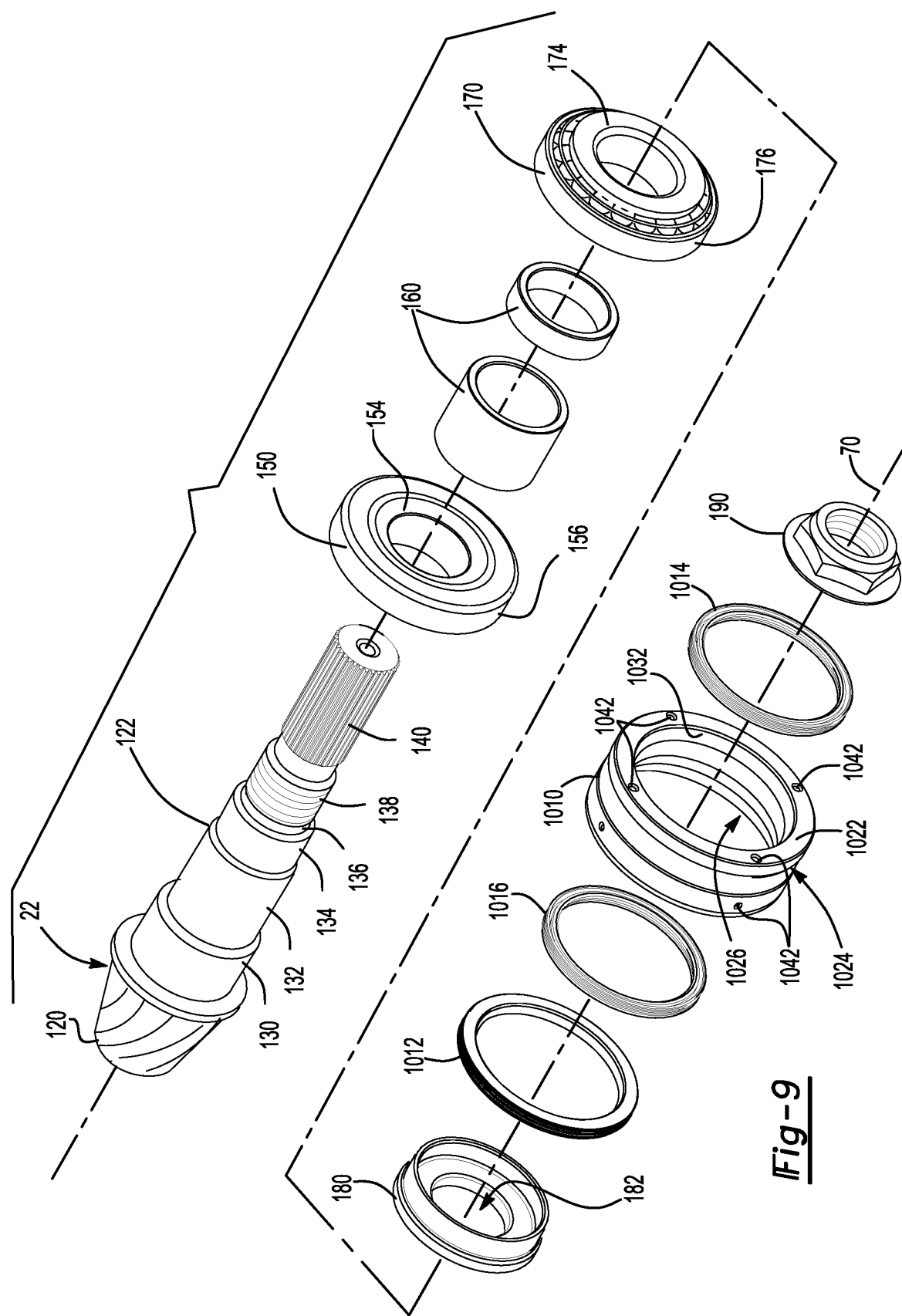
Figure 16:
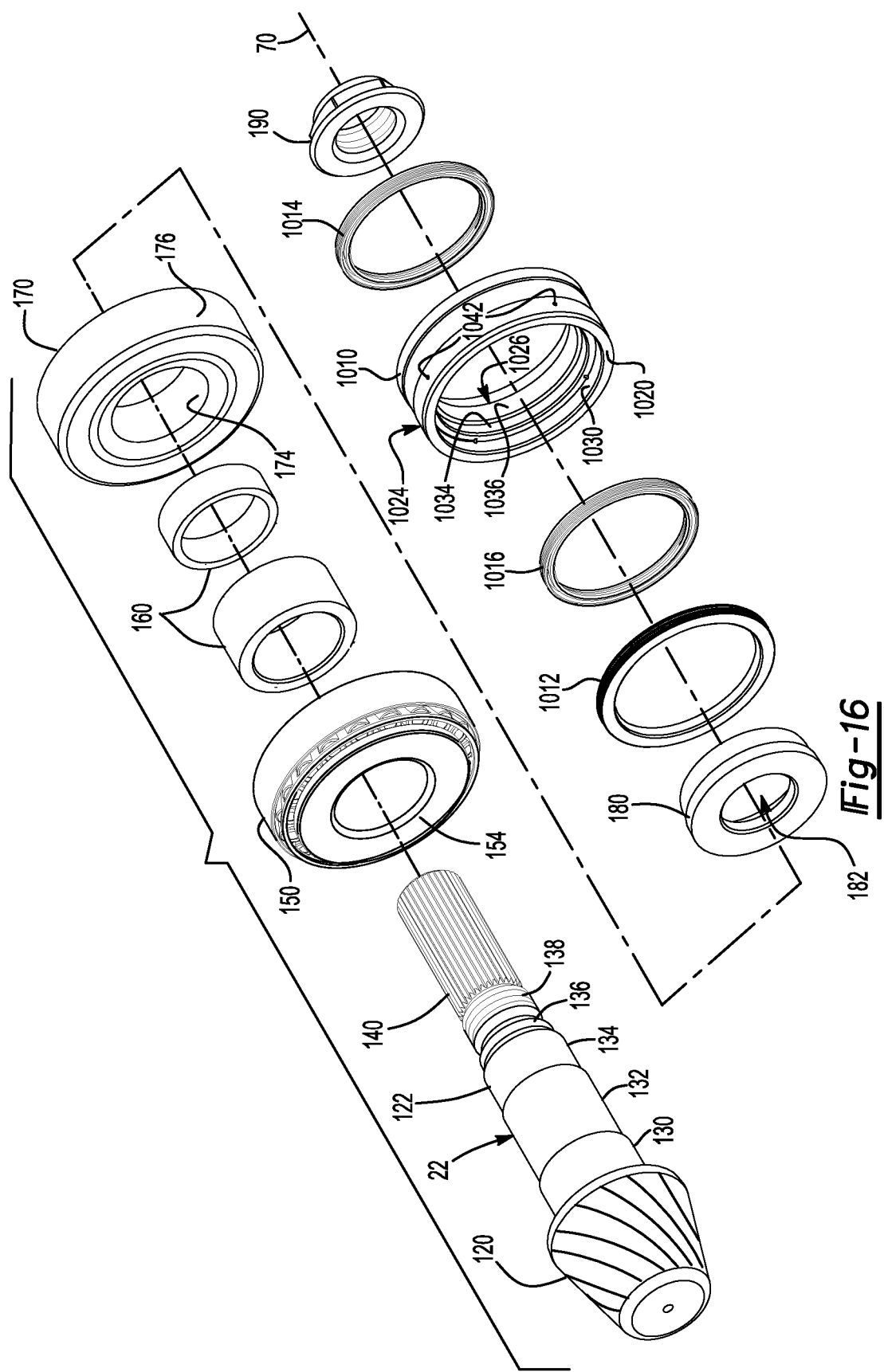

Referring to FIGS. 5, 9 and 16, the first outer surface 130 may extend from the gear portion 120 and may be an outside circumference of a portion of the shaft portion 122. A first drive pinion bearing 150 may be disposed on the first outer surface 130 and may rotatably support the drive pinion 22. The first drive pinion bearing 150 may have any suitable configuration. For instance, the first drive pinion bearing 150 may be configured as a roller bearing assembly that may include a plurality of rolling elements 152 that may be disposed between an inner race 154 and an outer race 156. The inner race 154 may extend around and may be disposed on the first outer surface 130. The outer race 156 may extend around the rolling elements 152 and may be disposed on the bearing support wall 64 of the differential carrier 42 and may be received in the hole 90 of the bearing support wall 64.

The second outer surface 132 may be axially positioned between the first outer surface 130 and the third outer surface 134. The second outer surface 132 may be an outside circumference of a portion of the shaft portion 122 and may have a smaller diameter than the first outer surface 130. One or more spacer rings 160 may be disposed on the second outer surface 132. The spacer rings 160 may be disposed between the inner races of the drive pinion bearings to inhibit axial movement of the drive pinion bearings toward each other.

The third outer surface 134 may be axially positioned between the second outer surface 132 and the fourth outer surface 136. The third outer surface 134 may be an outside circumference of a portion of the shaft portion 122 and may have a smaller diameter than the second outer surface 132. A second drive pinion bearing 170 may be disposed on the third outer surface 134 and may rotatably support the drive pinion 22. The second drive pinion bearing 170 may have any suitable configuration. For instance, the second drive pinion bearing 170 may be configured as a roller bearing assembly that may include a plurality of rolling elements 172 that may be disposed between an inner race 174 and an outer race 176. The inner race 174 may extend around and may be disposed on the third outer surface 134. The outer race 176 may extend around the rolling elements 172, may be disposed on the bearing support wall 64 of the differential carrier 42, and may be received in the hole 90 of the bearing support wall 64. The inner race 174 of the second drive pinion bearing 170 may have a smaller inside diameter than the inner race 154 of the first drive pinion bearing 150. The outer race 176 of the second drive pinion bearing 170 may have a smaller outside diameter than the outer race 156 of the first drive pinion bearing 150.

The fourth outer surface 136 may be axially positioned between the third outer surface 134 and the threaded portion 138. The fourth outer surface 136 may be an outside circumference of a portion of the shaft portion 122 and may have a smaller diameter than the third outer surface 134.

A seal support ring 180 may be disposed on the fourth outer surface 136. The seal support ring 180 may extend around the first axis 70 and may have a hole 182 that may receive the drive pinion 22. Moreover, the seal support ring 180 may engage and may facilitate sealing against the fourth outer surface 136 to help separate the axle assembly 10 into first and second lubricant chambers as will be discussed in more detail below. The seal support ring 180 may engage the inner race 174 of the second drive pinion bearing 170 and may support one or more seals as will be discussed in more detail below.

The threaded portion 138 may be axially positioned between the fourth outer surface 136 and the spline 140. The threaded portion 138 may facilitate installation of a preload nut 190.

The preload nut 190 may be threaded onto the threaded portion 138 and may secure the seal support ring 180 to the drive pinion 22. The seal support ring 180 may be axially positioned between the inner race 174 of the second drive pinion bearing 170 and the preload nut 190. The preload nut 190 may apply a preload force on the first and second drive pinion bearings 150, 170 via the seal support ring 180. As is best shown in FIG. 5, a portion of the seal support ring 180 may overhang and may extend around the preload nut 190 and may be configured to support a seal as will be discussed in more detail below.

The spline 140 may be disposed between the threaded portion 138 and an end of the shaft portion 122 that may be disposed opposite the gear portion 120. The spline 140 may include a plurality of teeth. The teeth may be disposed substantially parallel to the first axis 70 and may mate with a corresponding spline on a shift collar of the shift mechanism 28 as will be discussed in more detail below. Alternatively, the teeth of the spline 140 may mate with a corresponding spline of a rotor output flange that may couple the drive pinion 22 to a rotor of the electric motor module 24 when the gear reduction module 26 and shift mechanism 28 are omitted.

Electric Motor Module

Referring to FIG. 2, the electric motor module 24 may be mounted to the differential carrier 42 and may provide torque to the differential assembly 30 via the drive pinion 22. The electric motor module 24 may be primarily disposed outside the differential carrier 42. In addition, the electric motor module 24 may be axially positioned between the axle housing 40 and the gear reduction module 26 and the axle housing 40. Main components of the electric motor module 24 are best shown with reference to FIGS. 7, 8, 11, 14, 15 and 18. In at least one configuration, the electric motor module 24 may include a motor housing 200, a coolant jacket 202, a stator 204, a rotor 206, a first rotor bearing assembly 208, a second rotor bearing assembly 210, a rotor bearing preload module 212, and a motor cover 214.

Referring to FIGS. 2, 7, 14 and 21, the motor housing 200 may extend between the differential carrier 42 to the motor cover 214. For example, the motor housing 200 may extend from the mounting flange 62 of the differential carrier 42 to the motor cover 214. The motor housing 200 may extend around a first axis 70 to define a motor housing cavity 220. The motor housing cavity 220 may have a generally cylindrical configuration. The motor housing 200 may extend continuously around and may be spaced apart from the bearing support wall 64 of the differential carrier 42. In at least one configuration, the motor housing 200 may have an exterior surface 222, an interior surface 224, a first end surface 226, a second end surface 228, a set of fastener holes 230, and one or more ports 232.

The exterior surface 222 may face away from the first axis 70 and may define an exterior or outside surface of the differential carrier 42.

The interior surface 224 may be disposed opposite the exterior surface 222. The interior surface 224 may be disposed at a substantially constant radial distance from the first axis 70 in one or more configurations.

Figure 21:
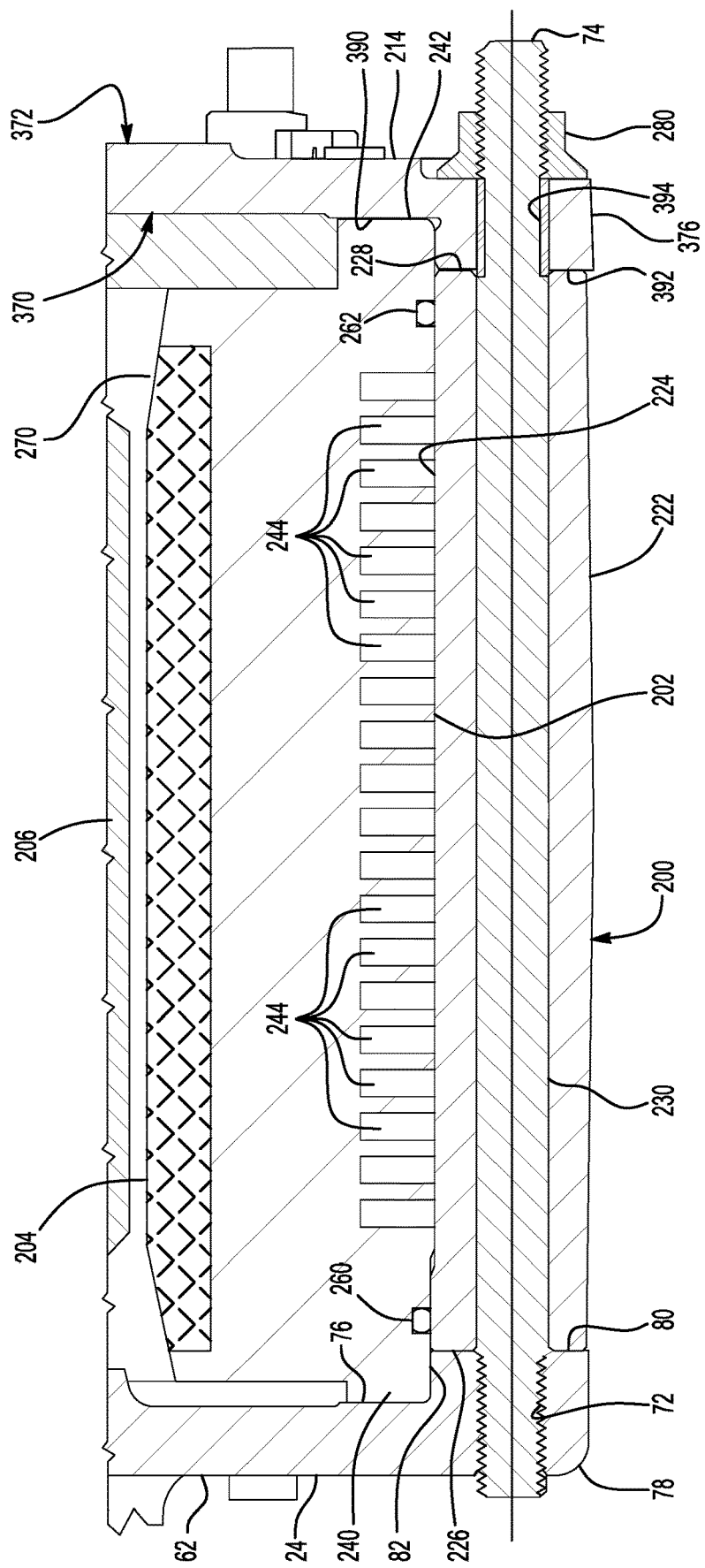
FIG. 21 is a section view of a portion of an electric motor module of the axle assembly along section line 21-21.

The first end surface 226 may extend between the exterior surface 222 and the interior surface 224. The first end surface 226 may be disposed at an end of the motor housing 200 that may face toward the differential carrier 42. More specifically, the first end surface 226 may be disposed adjacent to the mounting flange 62 of the differential carrier 42. As is best shown in FIG. 21, the first end surface 226 may engage the ring end surface 80 of the locating ring 78 of the differential carrier 42. However, the motor housing 200 and the first end surface 226 may not be received inside the mounting flange 62 of the differential carrier 42.

The second end surface 228 may be disposed opposite the first end surface 226. As such, the second end surface 228 may be disposed at an end of the motor housing 200 that may face toward and may engage the motor cover 214. The second end surface 228 may extend between the exterior surface 222 and the interior surface 224. In at least one configuration, the second end surface 228 may not be received inside the motor cover 214.

The set of fastener holes 230 may be arranged around the first axis 70 and may be aligned with the fastener holes 72 of the differential carrier 42. As such, the fastener holes 230 may be spaced apart from each other and may be disposed substantially parallel to each other and substantially parallel to the first axis 70. Each fastener hole 230 may between the first end surface 226 to the second end surface 228. For example, the fastener holes 230 may extend from the first end surface 226 to the second end surface 228. Each fastener hole 230 may receive a fastener 74 that may secure the motor housing 200 to the mounting flange 62, the motor cover 214, or both. For example, each fastener 74 may extend through the fastener hole 230 and may protrude from the first end surface 226 and the second end surface 228. Opposing ends of the fastener 74 may be threaded. For example, one threaded end may be received in the fastener hole 72 of the differential carrier 42 and may mate with the threads of the fastener hole 72 of the differential carrier 42. Alternatively, the fastener 74 may extend through the fastener hole 72 of the differential carrier 42 and may be received in a nut that may secure the motor housing 200 to the differential carrier 42. Similarly, an opposing threaded end of a fastener 74 may mate with threads of a fastener hole of the motor cover 214 or may extend through a fastener hole in the motor cover 214 and may be received in a nut that may secure the motor cover 214 to the motor housing 200.

Referring to FIGS. 7 and 14, one or more ports 232 may extend through the motor housing 200. The ports 232 may be configured as a through holes that may extend from the exterior surface 222 to the interior surface 224. The ports 232 may allow coolant, such as a fluid like water, to flow to and from the coolant jacket 202 as will be described in more detail below.

Figure 8:
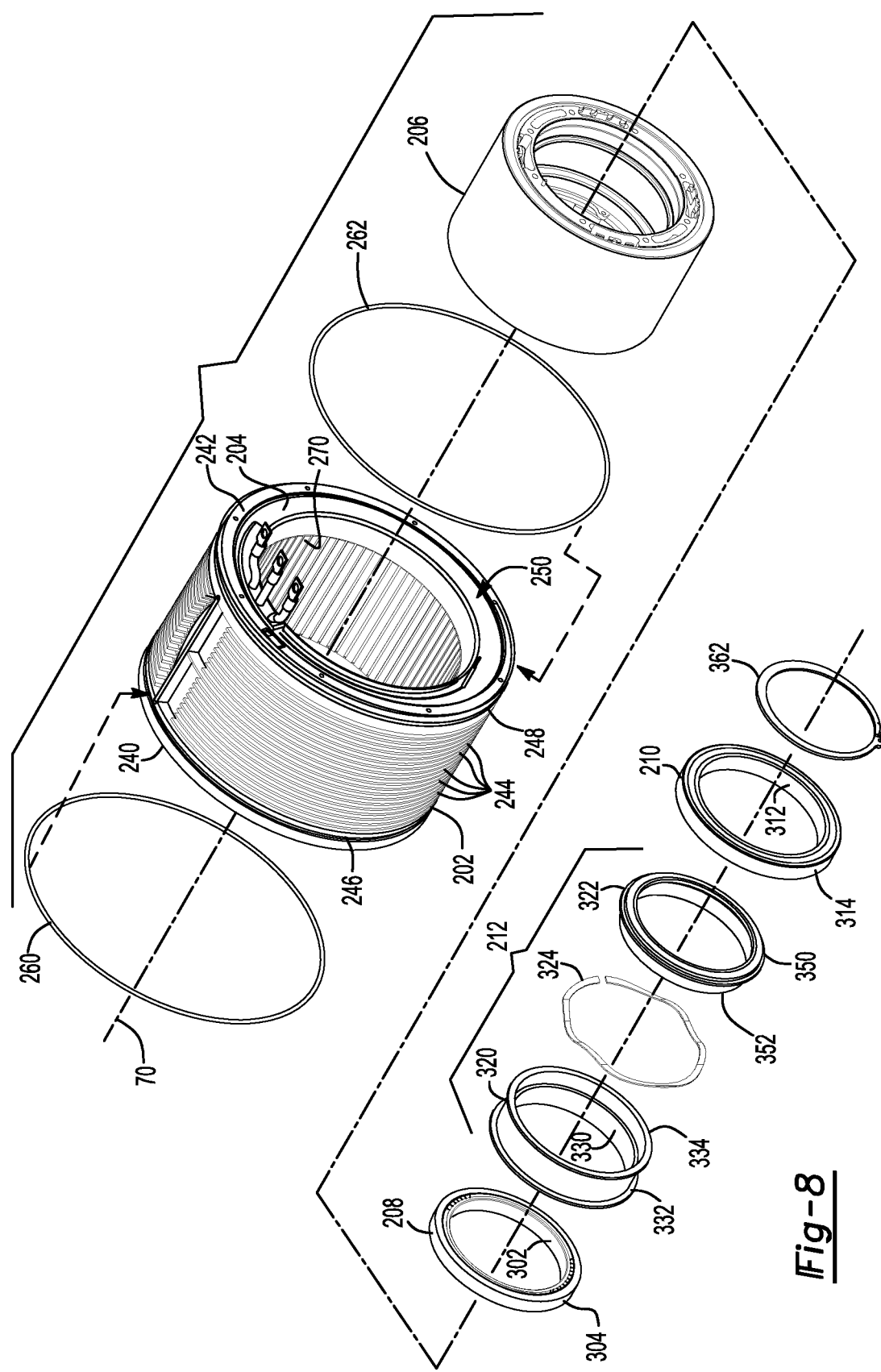
Figure 15:
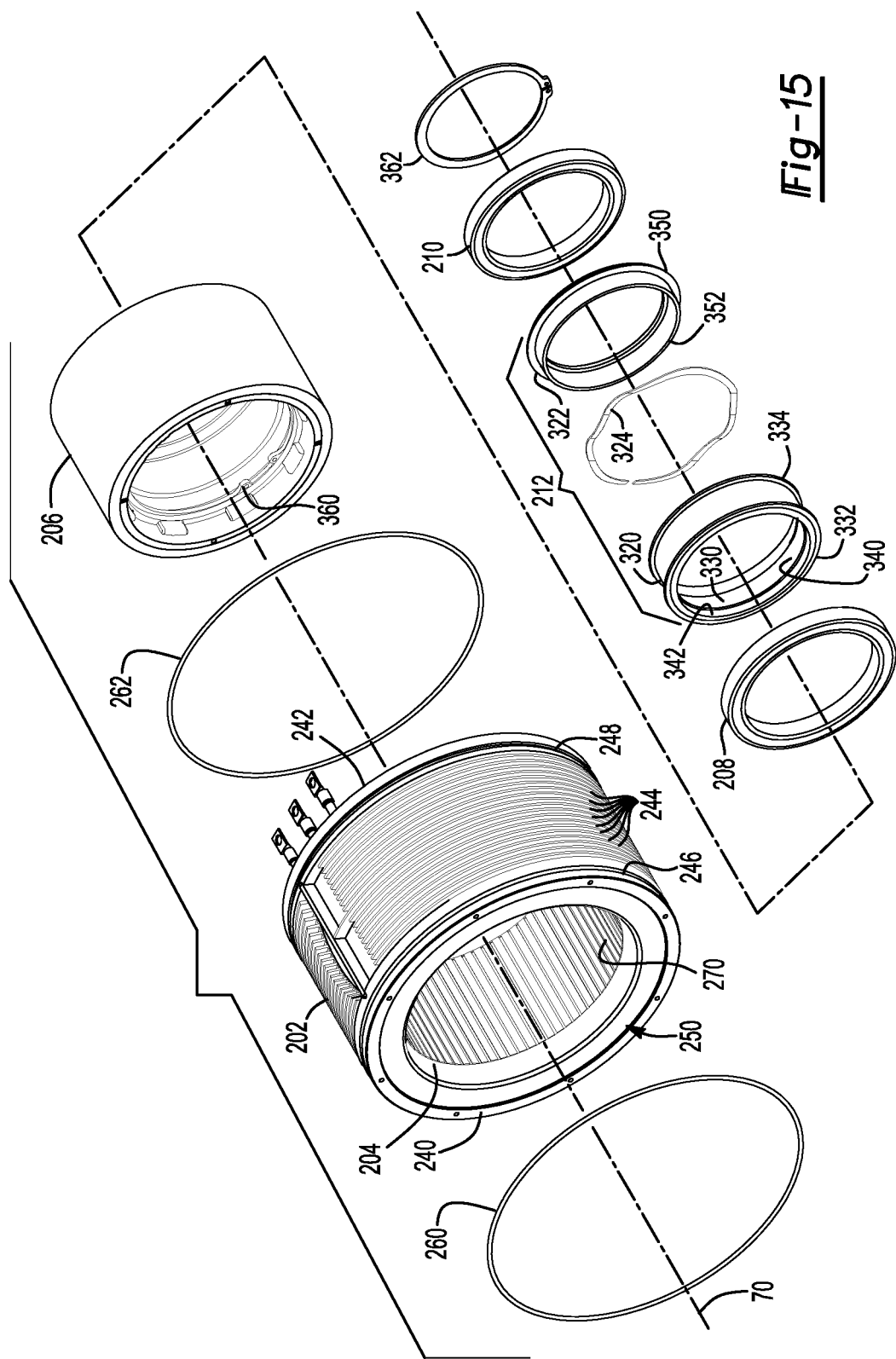

Referring to FIGS. 8, 15 and 21, the coolant jacket 202 may help cool or remove heat from the stator 204. The coolant jacket 202 may be received in the motor housing cavity 220 and may engage the interior surface 224 of the motor housing 200. The coolant jacket 202 may extend axially between the differential carrier 42 and the motor cover 214. In addition, the coolant jacket 202 may extend around the first axis 70 and the stator 204. In at least one configuration, the coolant jacket 202 may include a first coolant jacket end surface 240, a second coolant jacket end surface 242, a plurality of channels 244, a first groove 246, a second groove 248, and a coolant jacket cavity 250.

The first coolant jacket end surface 240 may be disposed at an end of the coolant jacket 202 and may face toward the differential carrier 42. More specifically, the first coolant jacket end surface 240 may be disposed outside the motor housing 200 and may be received inside the mounting flange 62 of the differential carrier 42. For instance, the first coolant jacket end surface 240 may face toward and may contact the abutment surface 76 of the differential carrier 42 and may be received inside the locating ring 78.

The second coolant jacket end surface 242 may be disposed opposite the first coolant jacket end surface 240. As such, the second coolant jacket end surface 242 may face toward the motor cover 214. The second coolant jacket end surface 242 may be disposed outside the motor housing 200 and may be received inside a mounting flange of the motor cover 214.

The channels 244 may extend around the first axis 70 and may be disposed opposite the coolant jacket cavity 250. The channels 244 may be configured with an open side that may face away from the first axis 70 and toward the interior surface 224 of the motor housing 200. The channels 244 may be axially positioned between the first coolant jacket end surface 240 and the second coolant jacket end surface 242. Coolant may be provided to the coolant jacket 202 via a first port 232 and may exit the coolant jacket 202 via a second port 232. For instance, coolant may flow from the first port 232 to the channels 244, receive heat from the stator 204 as the coolant flows through the channels 244, and exit at the second port 232. A baffle may be provided with the coolant jacket 202 that may reverse the direction of coolant flow to help route coolant from the first port 232 to the second port 232.

The first groove 246 may be provided in an exterior surface of the coolant jacket 202 that may face toward the interior surface 224 of the motor housing 200. The first groove 246 may extend around the first axis 70 and may be axially positioned between the first coolant jacket end surface 240 and the channels 244. The first groove 246 may receive a first seal 260. The first seal 260 may seal against the interior surface 224 of the motor housing 200. The first seal 260 may have any suitable configuration. For example, the first seal 260 may be configured as an O-ring that may extend continuously around the coolant jacket 202.

The second groove 248 may be provided in the exterior surface of the coolant jacket 202. The second groove 248 may extend around the first axis 70 and may be axially positioned between the second coolant jacket end surface 242 and the channels 244. The second groove 248 may receive a second seal 262. The second seal 262 may seal against the interior surface 224 of the motor housing 200. The second seal 262 may have any suitable configuration. For example, the second seal 262 may be configured as an O-ring that may extend continuously around the coolant jacket 202. The first seal 260 and the second seal 262 may cooperate to inhibit or prevent leakage of coolant between the motor housing 200 and the coolant jacket 202.

The coolant jacket cavity 250 may be defined by the coolant jacket 202. The coolant jacket cavity 250 may be configured as a through hole that may extend from the first coolant jacket end surface 240 to the second coolant jacket end surface 242 and may be disposed opposite the channels 244. The coolant jacket cavity 250 may receive the stator 204.

The stator 204 may be fixedly positioned with respect to the coolant jacket 202. For example, the stator 204 may extend around the first axis 70 and may include stator windings 270 that may be received inside and may be fixedly positioned with respect to the coolant jacket 202, which are best shown in FIGS. 8 and 15.

The motor housing 200, coolant jacket 202, and the stator 204 may be preassembled to provide a subassembly that may be assembled other components. An example of an associated assembly sequence is as follows.

First, the coolant jacket 202 may be provided. The coolant jacket 202 may include the channels, grooves, and other features previously discussed.

Second, the stator windings 270 may be installed on the coolant jacket 202. Installing the stator windings 270 may include positioning the stator windings 270 inside the coolant jacket cavity 250 and against the inside circumference of the coolant jacket 202. The stator windings 270 may then be encapsulated or "potted" using any suitable encapsulation material, such as a polymeric material, epoxy resin, or the like. Encapsulation may help electrically insulate the stator windings 270 and may provide chemical and environmental protection.

Third, one or more seals may be installed on the coolant jacket 202. For instance, the first seal 260 may be installed in the first groove 246 and the second seal 262 may be installed in the second groove 248. The first seal 260 and the second seal 262 may protrude past the outside circumference of the coolant jacket 202 when installed.

Fourth, the coolant jacket 202 along with the stator 204 may be installed in the motor housing cavity 220 of the motor housing 200. The motor housing 200 may be heated to expand or increase the size of the motor housing cavity 220 prior to installation. For instance, heating the motor housing 200 may increase the size or inside diameter of the motor housing cavity 220, which may facilitate installation of the coolant jacket 202 and help avoid displacement of the first and second seals 260, 262 and/or damage to the first and second seals 260, 262. The coolant jacket 202 along with the stator 204, first seal 260, and second seal 262, may be inserted into the motor housing cavity 220 once the motor housing 200 has been heated to a sufficient temperature or for a sufficient period of time to obtain a desired inside diameter.

Fifth the motor housing 200 may be allowed to cool. Cooling the motor housing 200 may reduce the size of the motor housing cavity 220 and may facilitate sealing between the motor housing 200 and the first and second seals 260, 262. Accordingly, the interior surface 224 of the motor housing 200 may engage and may compress against the first and second seals 260, 262. The motor housing 200 may be sufficiently cooled when it reaches ambient temperature or is sufficiently close to ambient temperature.

Sixth, quality checks may be conducted. Such quality checks may include a leak test and a high potential ("hipot") withstand test.

The leak test may be conducted to determine whether a leak is present between the motor housing 200 and the coolant jacket 202. For example, a pressurized fluid, such as a gas or liquid may be provided via at least one port 232 to the channels 244. The fluid pressure may be monitored to determine whether a leak of a sufficient magnitude is present. For instance, sealing may be acceptable when the fluid pressure is maintained for a predetermined period of time.

The high potential withstand test made be conducted to determine whether the stator windings 270 are adequately insulated. For example, a standard test voltage may be applied to the stator windings 270 and a leakage current that flows through the insulation or encapsulation material may be monitored. Insulation of the stator windings 270 may be acceptable when the leakage current is less than a predetermined value or limit. It is contemplated that the leak test and the high potential withstand test may be conducted concurrently or sequentially. For example, the high potential withstand test may be conducted after the leak test in one or more configurations.

Seventh, the subassembly may be assembled to the differential carrier 42. The subassembly may include the motor housing 200, coolant jacket 202, the stator 204 and the first and second seals 260, 262. The motor housing 200 may be placed into engagement with the locating ring 78 of the mounting flange 62 of the differential carrier 42 such that the first end surface 226 of the motor housing 200 may engage the ring end surface 80 of the locating ring 78. The first coolant jacket end surface 240 may be received inside the locating ring 78 such that the inner ring surface 82 may extend around a portion of the coolant jacket 202 that protrudes from the motor housing 200. Fasteners 74 may be inserted through the fastener holes 230 in the motor housing 200 and into the fastener holes 72 of the mounting flange 62 of the differential carrier 42 and may be secured as previously discussed.

Eighth, the motor cover 214 may be mounted to and secured to the motor housing 200. For example, the motor cover 214 may be placed into engagement with the second end surface 228 of the motor housing 200. The fasteners 74 may facilitate securing of the motor cover 214. For example, the fasteners 74 may extend through corresponding fastener holes in the motor cover 214. The fasteners 74 may be received in nuts 280 that may secure motor cover 214 to the motor housing 200 as is best shown in FIG. 21.

Referring to FIGS. 2, 8 and 15, the rotor 206 may extend around the first axis 70 and may be received inside the stator 204 and the motor housing 200. The rotor 206 may be rotatable about the first axis 70 with respect to the differential carrier 42 and the stator 204. The rotor 206 may be spaced apart from the stator 204 but may be disposed close to the stator 204. The rotor 206 may include magnets or ferromagnetic material that may facilitate the generation of electrical current. The rotor 206 may extend around and may be supported by the bearing support wall 64. The rotor 206 may be operatively connected to the drive pinion 22 with or without a gear reduction module 26. For instance, the rotor 206 may be operatively connected to the drive pinion 22 between the end of the bearing support wall 64 and the motor cover 214, such as with a rotor output flange 290 as will be discussed in more detail below.

Referring to FIGS. 5, 8 and 15, the first rotor bearing assembly 208 may rotatably support the rotor 206. The first rotor bearing assembly 208 may receive the bearing support wall 64 of the differential carrier 42 and may be received inside of the rotor 206. The first rotor bearing assembly 208 may be axially positioned closer to the axle housing 40 than the second rotor bearing assembly 210. The first rotor bearing assembly 208 may have any suitable configuration. For instance, the first rotor bearing assembly 208 may include a plurality of rolling elements 300 that may be disposed between an inner race 302 and an outer race 304. The inner race 302 may extend around and may receive the bearing support wall 64 of the differential carrier 42. For example, the inner race 302 may extend around and may engage the first circumferential surface 100 of the bearing support wall 64. The outer race 304 may extend around the rolling elements 300 and may be disposed on the rotor 206.

The second rotor bearing assembly 210 may be spaced apart from the first rotor bearing assembly 208. The second rotor bearing assembly 210 may be positioned closer to the motor cover 214 than the first rotor bearing assembly 208. The second rotor bearing assembly 210 may have any suitable configuration. For instance, the second rotor bearing assembly 210 may include a plurality of rolling elements 310 that may be disposed between an inner race 312 and an outer race 314. The inner race 312 may extend around and may receive the bearing support wall 64 of the differential carrier 42. For example, the inner race 312 may extend around and may engage the third circumferential surface 104 of the bearing support wall 64. The outer race 314 may extend around the rolling elements 310 and may be disposed on the rotor 206.

The rotor bearing preload module 212 may be axially positioned between the first rotor bearing assembly 208 and the second rotor bearing assembly 210. In addition, the rotor bearing preload module 212 may receive and may extend around the bearing support wall 64. The rotor bearing preload module 212 may exert a preload force on at least one rotor bearing assembly. In addition, the rotor bearing preload module 212 may cooperate with various components to help position the rotor bearing assemblies and inhibit axial movement of the rotor bearing assemblies with respect to the bearing support wall 64. In at least one configuration, the rotor bearing preload module 212 may include a first bearing preload ring 320, a second bearing preload ring 322, and a biasing member 324.

The first bearing preload ring 320 may generally extend around the second circumferential surface 102 of the bearing support wall 64. In addition, the first bearing preload ring 320 may extend from the first rotor bearing assembly 208. For example, the first bearing preload ring 320 may engage the inner race 302 of the first rotor bearing assembly 208 and may be spaced apart from the outer race 304 of the first rotor bearing assembly 208. The first bearing preload ring 320 may be axially movable or movable in an axial direction with respect to the second bearing preload ring 322. In at least one configuration, the first bearing preload ring 320 may include a center portion 330, a first side portion 332, and a second side portion 334.

The center portion 330 may be axially positioned between the first side portion 332 and the second side portion 334. The center portion 330 may be disposed on the differential carrier 42. For example, the center portion 330 may have a center portion inner surface 340 that may face toward the first axis 70 and may engage the second circumferential surface 102 of the bearing support wall 64. The center portion inner surface 340 may be disposed substantially parallel to the second circumferential surface 102 and may be generally smooth to facilitate sliding axial movement.

The first side portion 332 may extend from the center portion 330 to the first rotor bearing assembly 208. For example, the first side portion 332 may extend from the center portion 330 to the inner race 302 of the first rotor bearing assembly 208. The first side portion 332 may have a first inner surface 342 that may face toward the first axis 70. The first inner surface 342 or a portion thereof may have a larger diameter than the center portion inner surface 340. In addition, the first inner surface 342 or a portion thereof may be spaced apart from the bearing support wall 64 of the differential carrier 42.

The second side portion 334 may be disposed opposite the first side portion 332. The second side portion 334 may extend from the center portion 330 toward the second rotor bearing assembly 210. In addition, the second side portion 334 may extend around part of the second bearing preload ring 322. As such, the second side portion 334 may be spaced apart from the bearing support wall 64 of the differential carrier 42.

The second bearing preload ring 322 may extend around the second circumferential surface 102 and the third circumferential surface 104 of the bearing support wall 64. In addition, the second bearing preload ring 322 may extend from the second rotor bearing assembly 210. For example, the second bearing preload ring 322 may engage the inner race 312 of the second rotor bearing assembly 210 and may be spaced apart from the outer race 314 of the second rotor bearing assembly 210. The second bearing preload ring 322 may be stationary and may not move in an axial direction. In at least one configuration, the second bearing preload ring 322 may include a bearing contact portion 350 and a guide portion 352.

The bearing contact portion 350 may extend from the second rotor bearing assembly 210. For example, the bearing contact portion 350 may engage or contact the inner race 312 of the second rotor bearing assembly 210. In addition, the bearing contact portion 350 may be disposed on the differential carrier 42. For instance, the bearing contact portion 350 may engage the third circumferential surface 104 of the bearing support wall 64. The bearing contact portion 350 may have a smaller diameter than the guide portion 352.

The guide portion 352 may be at least partially received inside the second side portion 334 of the first bearing preload ring 320. In addition, the guide portion 352 may extend around and may engage the second circumferential surface 102 of the bearing support wall 64. The guide portion 352 may extend in an axial direction from the bearing contact portion 350 toward the first rotor bearing assembly 208. As such, the guide portion 352 may extend toward the center portion 330 of the first bearing preload ring 320. The guide portion 352 may be spaced apart from the center portion 330 due to the biasing force exerted by the biasing member 324.

The biasing member 324 may bias the first bearing preload ring 320 in an axial direction with respect to the second bearing preload ring 322. For example, the biasing member 324 may exert a biasing force that may bias the first rotor bearing assembly 208 away from the second rotor bearing assembly 210 away from each other. As is best shown in FIG. 5, the biasing member 324 may be disposed between the first bearing preload ring 320 and the second bearing preload ring 322. For instance, the biasing member 324 may extend from the second side portion 334 of the first bearing preload ring 320 to the guide portion 352 of the second bearing preload ring 322.

The biasing member 324 may have any suitable configuration. For example, biasing member 324 may extend around a portion of second bearing preload ring 322, such as the guide portion 352. In such a configuration, the biasing member 324 may be a spring like a wave spring or a wave washer that may extend continuously around the first axis 70. Alternatively, the biasing member 324 may not extend continuously around the first axis 70. It is also contemplated that multiple biasing members 324 may be provided. For instance, multiple biasing members 324 such as coil springs may be arranged at various locations around the first axis 70.

Referring to FIGS. 5 and 15, a first retaining member 360 may be positioned on an opposite side of the first rotor bearing assembly 208 from the first bearing preload ring 320. The first retaining member 360 may inhibit axial movement of the outer race 304 of the first rotor bearing assembly 208 toward the axle housing 40. The first retaining member 360 may be fixedly coupled to the rotor 206 in any suitable manner. For example, the first retaining member 360 may be received in a groove in the rotor 206. The first retaining member 360 may have any suitable configuration. For example, the first retaining member 360 may be configured as a protrusion, such as a snap ring, that may extend toward the first axis 70. The first retaining member 360 may be spaced apart from the inner race 302. Accordingly, the biasing force exerted by the biasing member 324 may actuate the inner race 302 with respect to the outer race 304.

A second retaining member 362 may be positioned on an opposite side of the second rotor bearing assembly 210 from the second bearing preload ring 322. The second retaining member 362 may inhibit axial movement of the inner race 312 of the second rotor bearing assembly 210 away from the axle housing 40. The second retaining member 362 may be coupled to the differential carrier 42 in any suitable manner. For example, the second retaining member 362 may be received in a groove 108 in the bearing support wall 64. The second retaining member 362 may have any suitable configuration. For example, the second retaining member 362 may be configured as a protrusion, such as a snap ring, that may extend away from the first axis 70. The second retaining member 362 may be spaced apart from the outer race 314.

Referring to FIGS. 2, 11, 18 and 21, the motor cover 214 may be mounted to the motor housing 200 and may be disposed opposite the axle housing 40. For example, the motor cover 214 may be mounted to the second end surface 228 of the motor housing 200. The motor cover 214 may be spaced apart from and may not engage the differential carrier 42. The motor cover 214 may be provided in various configurations. In at least one configuration, the motor cover 214 may include a first side 370 and a second side 372. The motor cover 214 may also include a motor cover opening 374 in configurations having a gear reduction module 26. Optionally, the motor cover 214 may include or may partially define one or more additional features, such as a locating ring 376, a junction box 378, an outer ring 380, and a resolver slot 382, and a bearing receiving surface 384.

Figure 11:
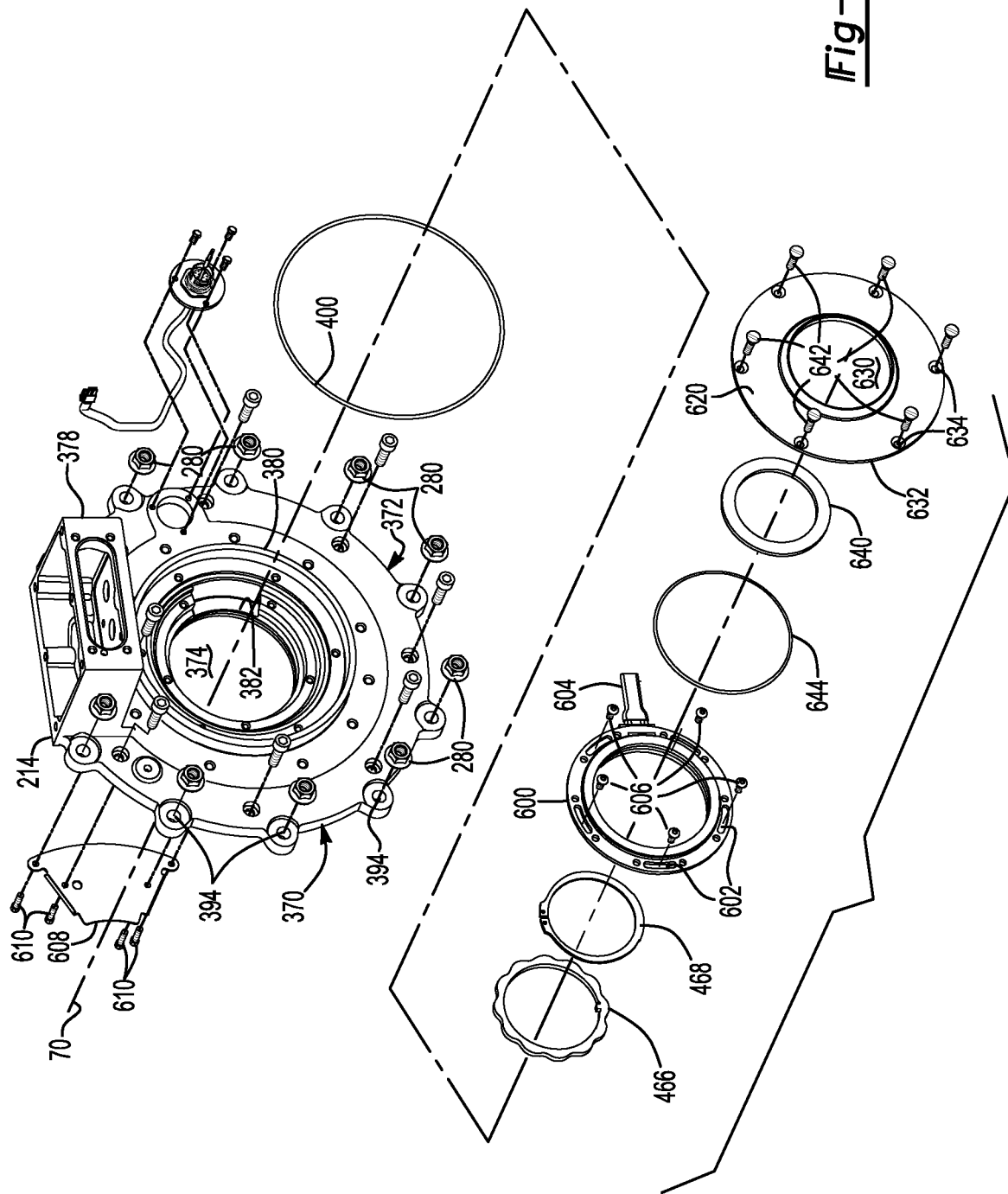
Figure 18:
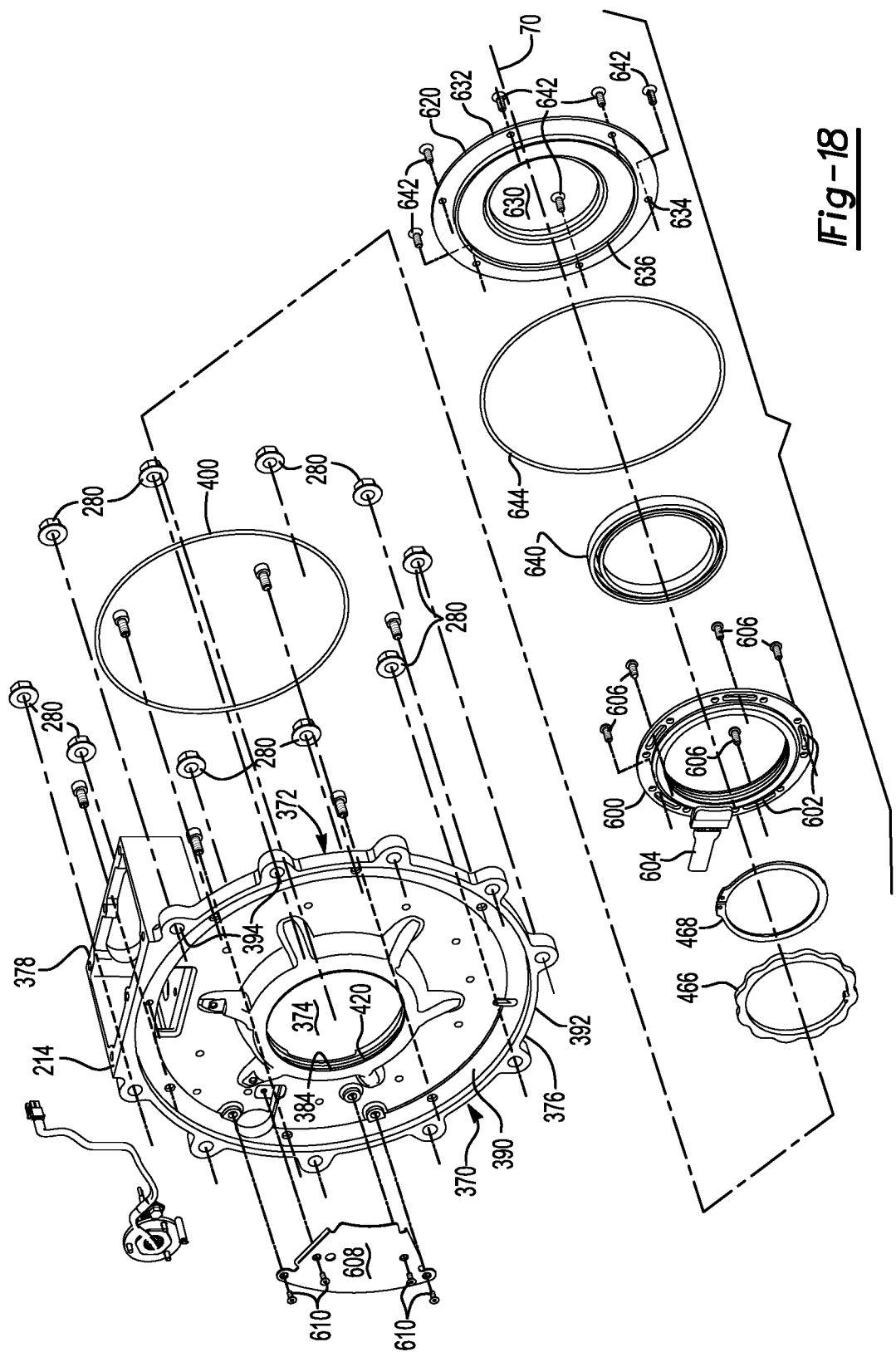

Referring primarily to FIGS. 11, 18 and 21, the first side 370 may face toward the axle housing 40.

The second side 372 may be disposed opposite the first side 370. As such, the second side 372 may face away from the axle housing 40.

The motor cover opening 374 may extend between the first side 370 and the second side 372. The motor cover opening 374 may be a through hole that may extend around the first axis 70.

The locating ring 376 may be configured to receive a portion of the electric motor module 24. The locating ring 376 may have a similar configuration as the locating ring 78 of the differential carrier 42. The locating ring 376 may extend around the first axis 70 and may protrude from an abutment surface 390 toward the axle housing 40. The abutment surface 390 may face toward and may be disposed proximate or engage the second coolant jacket end surface 242 of the coolant jacket 202. The locating ring 376 may have a ring end surface 392 that may be axially offset from the abutment surface 390 and may engage the second end surface 228 of the motor housing 200. The locating ring 376 may extend around and may receive a portion of the coolant jacket 202 that may protrude from the motor housing 200 toward the first side 370 of the motor cover 214. A plurality of fastener holes 394 may be disposed proximate the locating ring 376. The fastener holes 394 may extend into or through the locating ring 376. Each fastener hole 394 may be aligned with a corresponding fastener hole 230 of the motor housing 200 and may receive a corresponding fastener 74 as previously discussed.

Referring to FIGS. 11 and 18, the junction box 378 or portion thereof may be provided with the motor cover 214. The junction box 378 may extend from the second side 372 and may receive components that may facilitate electrical connections to the electric motor module 24. The junction box 378 may be integrally formed with the motor cover 214 or may be provided as a separate component.

Figure 6:
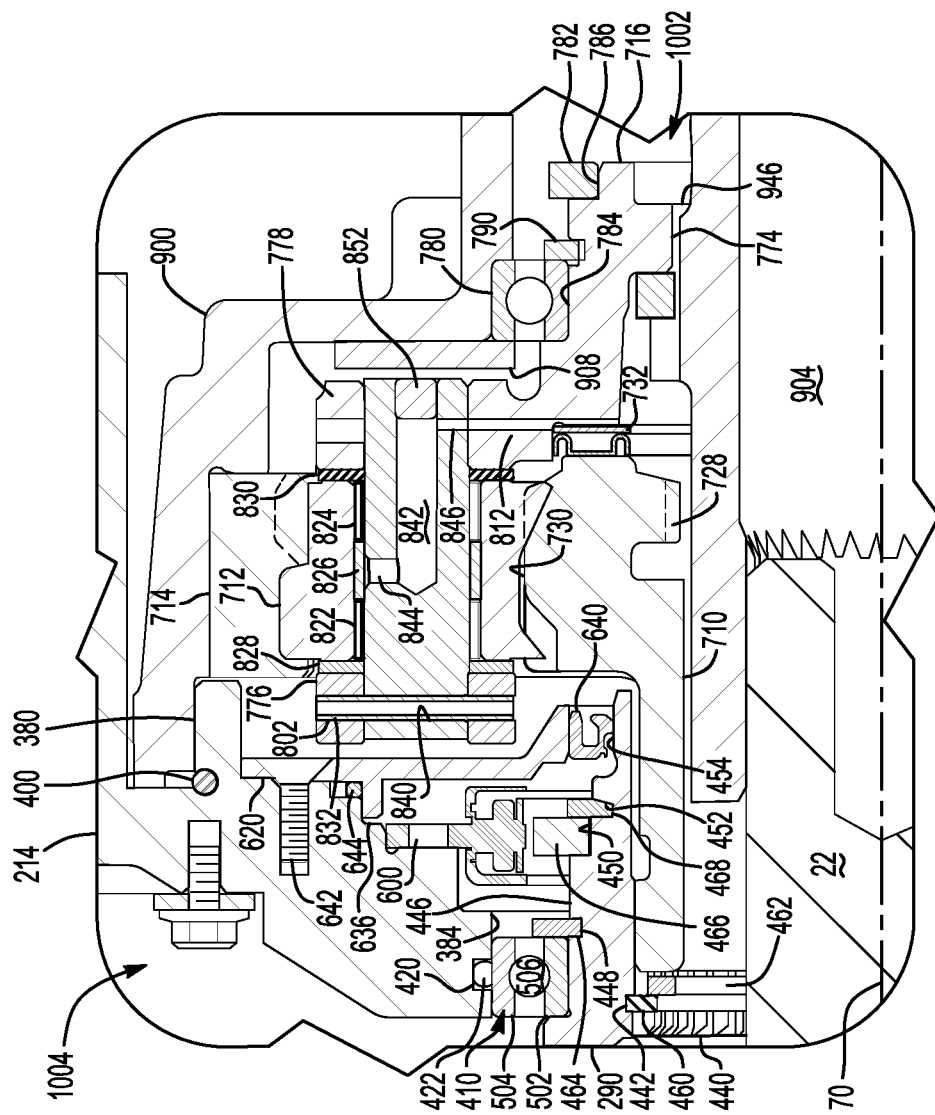
FIG. 6 is a magnified view of a portion of FIG. 2.

The outer ring 380 may extend from the second side 372. The outer ring 380 may extend continuously or discontinuously around the first axis 70. The outer ring 380 may provide multiple functions. For example, the outer ring 380 may act as a locating feature that may facilitate positioning and installation of a shift mechanism housing 900 as is best shown in FIG. 6. The outer ring 380 may also act as a stop that may inhibit axial movement of a planetary ring gear 714 of the gear reduction module 26. The outer ring 380 may also facilitate installation of a seal 400, such as an O-ring, that may be extend between the shift mechanism housing 900 and the motor cover 214. For instance, the seal 400 may extend around the outer ring 380 and may be received inside the shift mechanism housing 900.

Referring to FIG. 11, the resolver slot 382 may be disposed between the first side 370 and the second side 372 of the motor cover 214. The resolver slot 382 may be configured as a through hole that may extend to the motor cover opening 374. The resolver slot 382 may receive a portion of a resolver 600 as will be discussed in more detail below.

Referring to FIGS. 6 and 18, the bearing receiving surface 384 may partially define the motor cover opening 374. The bearing receiving surface 384 may extend around the first axis 70 and may extend from or may be disposed adjacent to the first side 370 of the motor cover 214. The bearing receiving surface 384 may be configured to receive and may optionally contact a spigot bearing assembly 410. The spigot bearing assembly 410 may receive the rotor output flange 290 and may help inhibit deflection of the rotor 206 as will be discussed in more detail below. A groove 420 may extend from the bearing receiving surface 384 in a direction that may extend away from the first axis 70. The groove 420 may receive a seal 422, such as an O-ring, that may extend around and may contact the spigot bearing assembly 410. Other mounting configurations for the spigot bearing assembly 410 will be discussed after discussing the rotor output flange 290 in more detail.

Rotor Output Flange

Referring to FIGS. 5, 6, 10 and 17, the rotor output flange 290 may operatively connect or couple the electric motor module 24 to the gear reduction module 26. For example, the rotor output flange 290 may couple the rotor 206 to a sun gear 710 of the gear reduction module 26 as will be discussed in more detail below. The rotor output flange 290 may be fixedly coupled to or fixedly mounted to the rotor 206. As such, the rotor output flange 290 may rotate about the first axis 70 with the rotor 206. The rotor output flange 290 may be partially disposed inside the bearing support wall 64 of the differential carrier 42 and may be partially disposed inside the motor housing 200 and the motor cover 214 of the electric motor module 24. In addition, the rotor output flange 290 may extend through the motor cover opening 374 of the motor cover 214. In at least one configuration, the rotor output flange 290 may include a tubular body 430 and a flange portion 432.

The tubular body 430 may extend around the first axis 70 and may define a rotor output flange hole 434. The rotor output flange hole 434 may be a through hole that may extend along and may be centered about the first axis 70. The drive pinion 22 may extend through the rotor output flange hole 434 and may be spaced apart from the rotor output flange 290. As is best shown in FIG. 6, the sun gear 710 of the gear reduction module 26 may be partially received in the rotor output flange 290 and hence may be partially received in the rotor output flange hole 434. In at least one configuration, the tubular body 430 may include a rotor output flange spline 440, an internal groove 442, a first seal support surface 444, a spigot bearing support surface 446, a first outer groove 448, a rotary disc support surface 450, a second outer groove 452, and a second seal support surface 454.

The rotor output flange spline 440 may be disposed in the rotor output flange hole 434. The rotor output flange spline 440 may have teeth that may be arranged around the first axis 70 and may extend toward the first axis 70. The teeth of the rotor output flange spline 440 may mate with a spline of the sun gear 710 such that the rotor output flange 290 may rotate about the first axis 70 with the sun gear 710 and the rotor 206.

As is best shown in FIG. 6, the internal groove 442 may be disposed in the rotor output flange hole 434 and may extend away from the first axis 70. The internal groove 442 may be axially positioned between a first end of the tubular body 430 that may face toward the axle housing 40 and the sun gear 710. The internal groove 442 may receive a snap ring 460 or other suitable fastener that may help inhibit axial movement of the sun gear 710 toward the axle housing 40. Optionally, a spacer 462 such as a washer may be received in the rotor output flange hole 434 and may be axially positioned between the internal groove 442 and the sun gear 710.

The first seal support surface 444 may extend from the first end of the tubular body 430 to the flange portion 432. The first seal support surface 444 may be disposed opposite the rotor output flange hole 434 and may be configured to support a seal as will be discussed in more detail below. The bearing support wall 64 may extend around at least a portion of the first seal support surface 444.

The spigot bearing support surface 446 may be axially positioned between the flange portion 432 and the second end of the tubular body 430. The spigot bearing support surface 446 may be configured to support the spigot bearing assembly 410 as will be discussed in more detail below.

Figure 10:
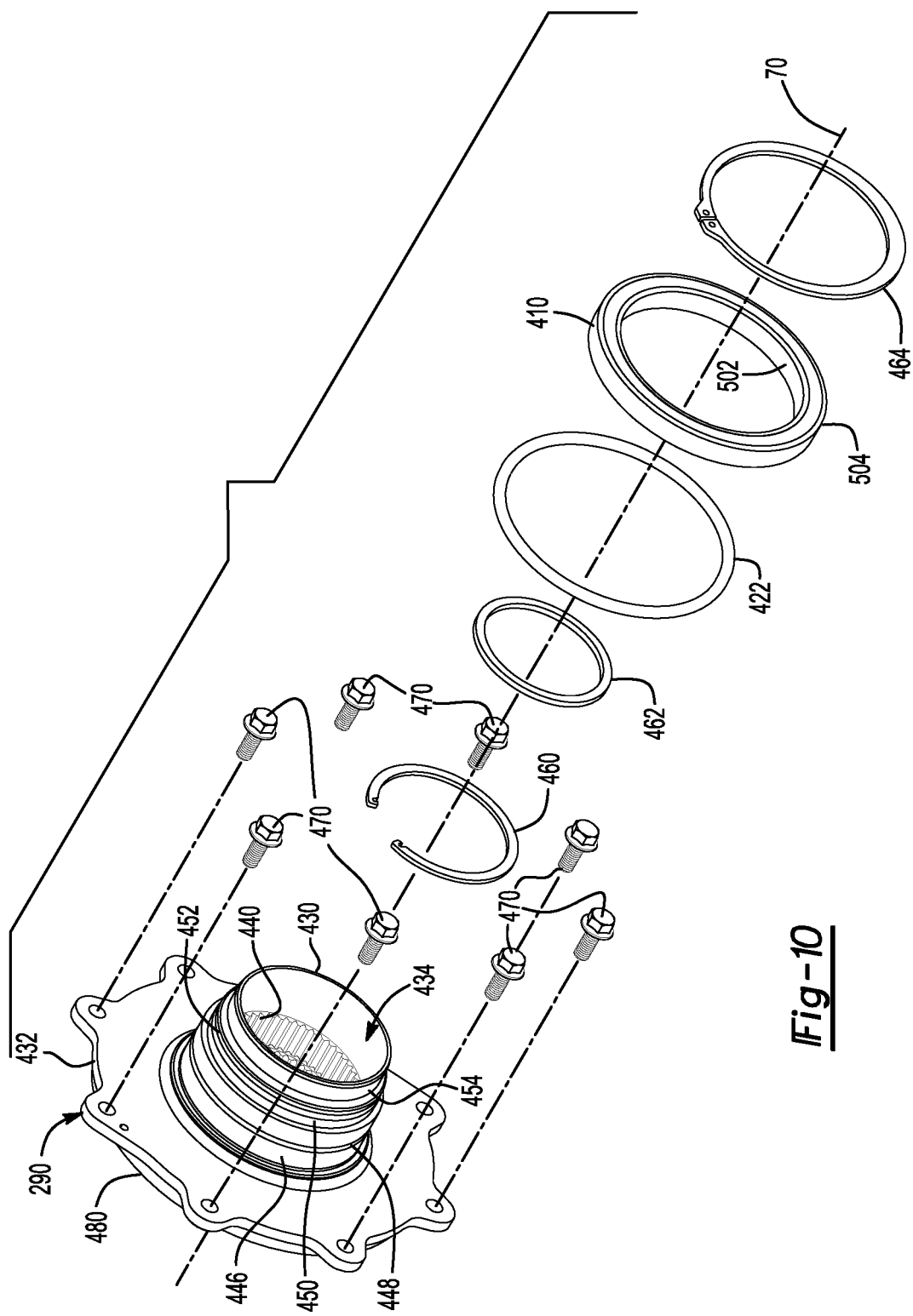

Referring to FIGS. 6 and 10, the first outer groove 448 may be disposed in the spigot bearing support surface 446 or adjacent to the spigot bearing support surface 446. As such, the first outer groove 448 may be disposed opposite the rotor output flange hole 434. The first outer groove 448 may extend around the first axis 70 and may extend toward the first axis 70. The first outer groove 448 may be axially positioned between the spigot bearing assembly 410 and the second end of the tubular body 430. The first outer groove 448 may receive a fastener 464, such as a snap ring, that may engage an inner race of the spigot bearing assembly 410 to inhibit axial movement of the inner race.

The rotary disc support surface 450 may be disposed opposite the rotor output flange hole 434 and may be axially positioned between the spigot bearing support surface 446 and the second end of the tubular body 430. In at least one configuration, the rotary disc support surface 450 may have a smaller diameter than the spigot bearing support surface 446. The rotary disc support surface 450 may support a rotary disc 466.

Referring to FIGS. 6 and 11, the rotary disc 466 may be fixedly disposed on the rotor output flange 290. As such, the rotary disc 466 may rotate about the first axis 70 with the rotor 206. The rotary disc 466 may be axially positioned between the spigot bearing assembly 410 and the second end of the rotor output flange 290. As such, the rotary disc 466 may be received in the rotor output flange hole 434 and may extend around the sun gear 710 of the gear reduction module 26. As is best shown in FIG. 11, the rotary disc 466 may have a non-cylindrical outer surface that may face away from the first axis 70 that may include a plurality of protrusions that may extend away from the first axis 70. The protrusions may be arranged in a repeating pattern around the first axis 70.

Referring to FIGS. 6 and 10, the second outer groove 452 may be disposed in the rotary disc support surface 450 or adjacent to the rotary disc support surface 450. As such, the second outer groove 452 may be disposed opposite the rotor output flange hole 434. The second outer groove 452 may extend around the first axis 70 and may extend toward the first axis 70. The second outer groove 452 may be axially positioned between the rotary disc 466 and the second seal support surface 454. The second outer groove 452 may receive a fastener 468, such as a snap ring, that may inhibit axial movement of the rotary disc 466.

The second seal support surface 454 may extend from the second end of the tubular body 430 toward the rotary disc support surface 450. The second seal support surface 454 may be disposed opposite the rotor output flange hole 434 and may be configured to support a seal as will be discussed in more detail below.

The flange portion 432 may be disposed between the first end and the second end of the tubular body 430. The flange portion 432 may extend from the tubular body 430 in a direction that extends away from the first axis 70. The flange portion 432 may be fixedly coupled to the rotor 206. For instance, the flange portion 432 may include a set of holes that may be arranged around the first axis 70 and that may receive fasteners 470, such as bolts, that may extend through the holes to couple the flange portion 432 to the rotor 206. In at least one configuration, the flange portion 432 may include one or more protrusions 480.

Figure 17:
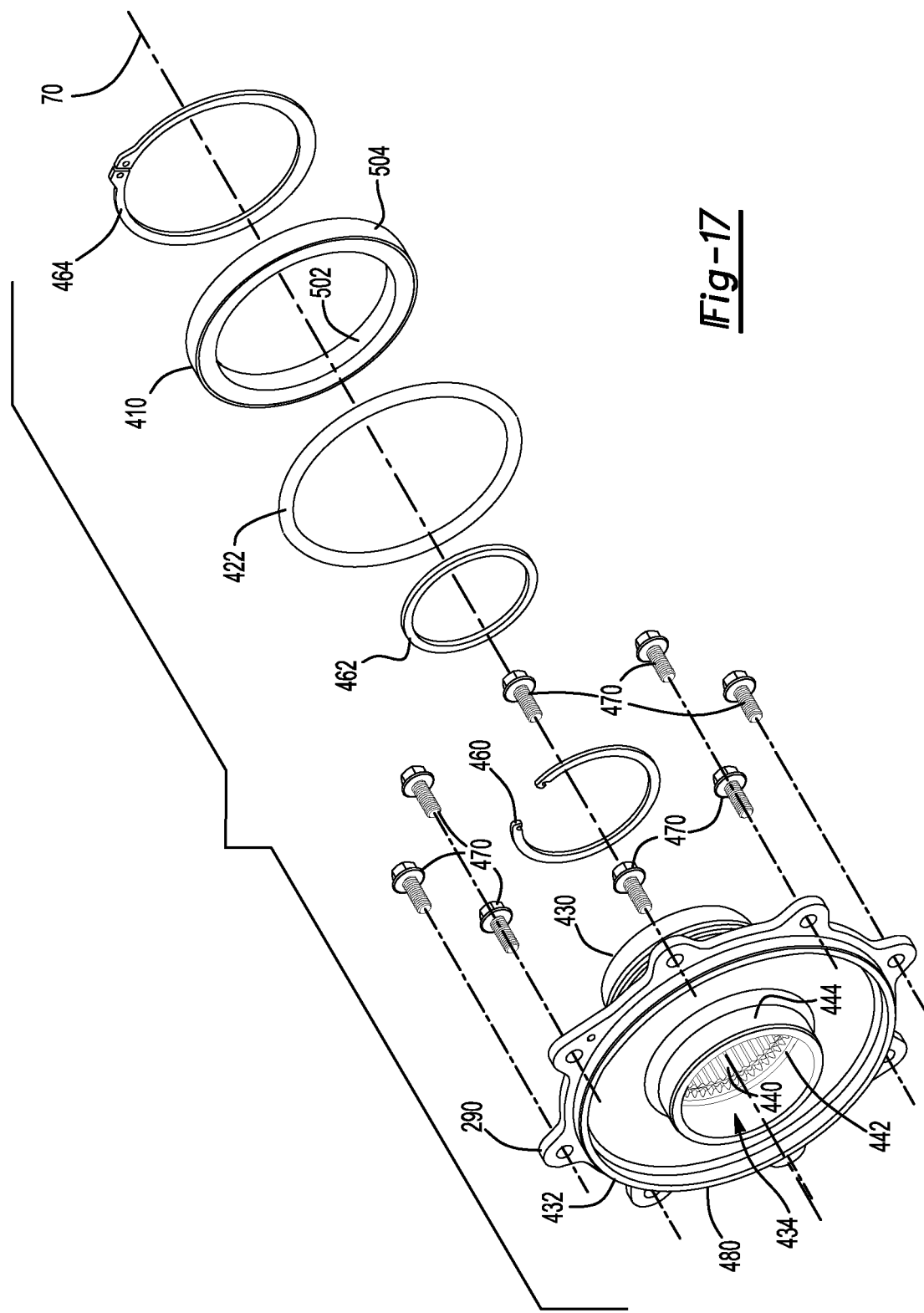

Referring to FIGS. 5 and 17, the protrusion 480 may extend in an axial direction toward the rotor 206. In at least one configuration, the protrusion 480 may be configured as an annular ring that may extend continuously around the first axis 70 and around the first seal support surface 444. In addition, the protrusion 480 may also extend around the second retaining member 362. As is best shown in FIG. 5, the protrusion 480 may extend into the rotor 206 and may engage the outer race 314 of the second rotor bearing assembly 210 to inhibit axial movement of the outer race 314 away from the first rotor bearing assembly 208. The rotor output flange 290 as well as the protrusion 480 may be spaced apart from the inner race 312 of the second rotor bearing assembly 210.

Spigot Bearing Assembly

Referring to FIGS. 5, 6, 10 and 17, the spigot bearing assembly 410 may receive the rotor output flange 290 and may rotatably support the rotor output flange 290. The spigot bearing assembly 410 may help inhibit deflection of the rotor 206, such as deflection with respect to the first axis 70. As such, the spigot bearing assembly 410 may help align or center the rotor 206 about the first axis 70 and may help improve the stability of the rotor 206 and maintain a desired air gap between the rotor 206 and the stator 204. As is best shown with reference to FIGS. 5 and 10, the spigot bearing assembly 410 may be received inside the rotor output flange hole 434 of the motor cover 214 and may extend between the motor cover 214 and the rotor output flange 290. The spigot bearing assembly 410 may also be axially positioned in the electric motor module 24 such that the spigot bearing assembly 410 is received inside of the motor housing 200 and inside of the coolant jacket 202.

Referring to FIGS. 6 and 10, the spigot bearing assembly 410 may have any suitable configuration. For instance, the spigot bearing assembly 410 may include a plurality of rolling elements 500 that may be disposed between an inner race 502 and an outer race 504. The inner race 502 may extend around and may engage the spigot bearing support surface 446 of the rotor output flange 290. The outer race 504 may extend around the rolling elements 500 and may engage the bearing receiving surface 384 of the motor cover 214.

Figure 22:
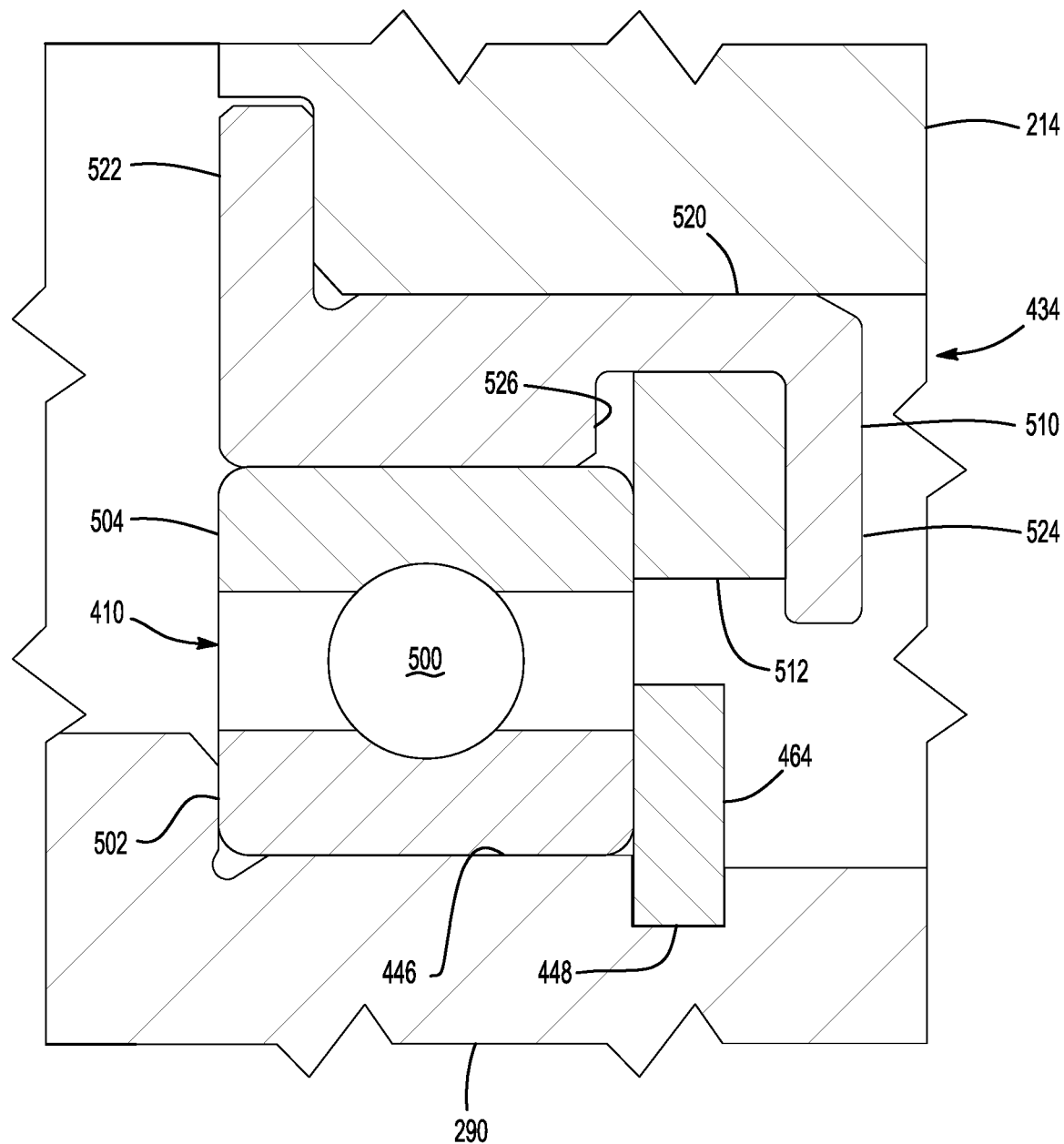
FIG. 22 is a magnified section view of an example of a spigot bearing assembly that may be provided with the axle assembly.

Referring to FIG. 22, an alternative arrangement for supporting the spigot bearing assembly 410 is shown. This arrangement may include an adapter 510 and a spigot bearing biasing member 512.

The adapter 510 may be received in the rotor output flange hole 434 of the motor cover 214. For example, the adapter 510 may be configured as a ring that may extend around the first axis 70 and may receive the spigot bearing assembly 410. The adapter 510 may also extend around and receive the spigot bearing biasing member 512. In at least one configuration, the adapter 510 may include a transverse wall 520, a first flange 522, and a second flange 524.

The transverse wall 520 may be radially positioned between the spigot bearing assembly 410 and the motor cover 214. In addition, the transverse wall 520 may extend generally parallel to the first axis 70. The transverse wall 520 may include a groove 526. The groove 526 may be disposed adjacent to the second flange 524. The groove 526 may extend around the first axis 70 and may extend away from the first axis 70.

The first flange 522 may extend from a first end of the transverse wall 520 in a direction that extends away from the first axis 70. The first flange 522 may extend continuously around the first axis 70 in one or more configurations. The first flange 522 may extend from the transverse wall 520 to the motor cover 214. As such, the first flange 522 may inhibit axial movement of the adapter 510 in a first direction with respect to the motor cover 214, or to the right from the perspective shown in FIG. 22.

The second flange 524 may be disposed opposite the first flange 522. As such, the second flange 524 may extend from a second end of the transverse wall 520. The second flange 524 may extend toward the first axis 70 and may extend continuously around the first axis 70. The second flange 524 may inhibit axial movement of the spigot bearing biasing member 512 in the first direction. The second flange 524 may be spaced apart from the spigot bearing assembly 410.

The spigot bearing biasing member 512 may be at least partially received in the groove 526 of the adapter 510. The spigot bearing biasing member 512 may extend from the second flange 524 and may be axially positioned such that the spigot bearing biasing member 512 may extend at least partially around the fastener 464. The spigot bearing biasing member 512 may also be axially positioned between the spigot bearing assembly 410 and a resolver 600 that may detect rotation of the rotor 206 as will be discussed in more detail below.

The spigot bearing biasing member 512 may exert a biasing force on the spigot bearing assembly 410 to inhibit skidding of the spigot bearing assembly 410. Skidding may include sliding motion of the rolling elements 500 rather than rolling motion of the rolling elements 500 with respect to the inner race 502, the outer race 504, or both. Skidding can disrupt lubricant on surfaces of the spigot bearing assembly 410 and result in increased operating temperatures, bearing component damage, and reduced service life. The spigot bearing biasing member 512 may engage the outer race 504 of the spigot bearing assembly 410 and may bias the outer race 504 of the spigot bearing assembly 410 toward the differential carrier 42, or to the left from the perspective shown in FIG. 22. This biasing force may preload the spigot bearing biasing member 512 to inhibit skidding of the rolling elements 500. The spigot bearing biasing member 512 may be spaced apart from the inner race 502 of the spigot bearing assembly 410.

Referring to FIG. 5, the spigot bearing biasing member 512 may also exert a biasing force on the second rotor bearing assembly 210, which may be axially positioned between the first rotor bearing assembly 208 and the spigot bearing assembly 410. More specifically, the spigot bearing biasing member 512 may exert a biasing force on the spigot bearing assembly 410, which in turn may exert a biasing force on the rotor output flange 290. This biasing force may be transmitted to the outer race 314 of the second rotor bearing assembly 210 via the protrusion 480 of the rotor output flange 290, which may bias the outer race 314 toward the first rotor bearing assembly 208.

The spigot bearing biasing member 512 may have any suitable configuration. For instance, the spigot bearing biasing member 512 may be configured as a spring, such as a wave spring or waive washer that may extend around the first axis 70. Alternatively, the spigot bearing biasing member 512 may not extend around the first axis 70. As one nonlimiting example, the spigot bearing biasing member 512 may include one or more springs, such as coil springs that may be arranged in an axial direction.

Resolver

Referring to FIGS. 6, 11 and 18, a resolver 600 may be associated with the electric motor module 24. The resolver 600, which may also be referred to as a resolver stator, may function as a sensor that may provide a signal indicative of rotation of the rotor 206 or the rotational position of the rotor 206. For example, the resolver 600 may detect the position of the rotary disc 466, such as by detecting the presence or absence of the protrusions of the rotary disc 466 or may detect rotation of the rotary disc 466. The resolver 600 may be of any suitable type. For example, the resolver 600 may be an analog resolver or a digital resolver, such as a rotary encoder.

The resolver 600 may generally be configured as a ring that may extend around the first axis 70. The resolver 600 may also extend around a portion of the rotor output flange 290, and the rotary disc 466 as is best shown in FIG. 6. The resolver 600 or a portion thereof may be received in the rotor output flange hole 434 of the motor cover 214 and may be mounted to the second side 372 of the motor cover 214. As such, the motor cover 214 may be disposed between the resolver 600 and the rotor 206 and the resolver 600 may be accessible from the outside of the electric motor module 24. Such positioning may also isolate the resolver 600 from lubricant in the lubricant chambers of the axle assembly 10 as will be discussed in more detail below. As is best shown in FIGS. 11 and 18, the resolver 600 may include a plurality of elongated slots 602 and an electrical connector 604.

The elongated slots 602 may facilitate mounting of the resolver 600 to the motor cover 214. A fastener 606, such as a screw or bolt, may extend through an associated elongated slot 602 and may the resolver 600 to the motor cover 214. The elongated slots 602 may be disposed at a substantially constant radial distance from the first axis 70 and may permit the resolver 600 to be rotated about the first axis 70 when the fasteners 606 are not fully tightened.

The electrical connector 604 may be disposed proximate the outside perimeter or outside circumference of the resolver 600. The electrical connector 604 may extend through the resolver slot 382 in the motor cover 214. The electrical connector 604 may be connected to an electrical power source to provide power to the resolver 600 and may facilitate electronic communication with an axle controller that may control operation of the electric motor module 24.

A resolver cover 608 may extend over the electrical connector 604 to protect the electrical connector 604 and separate the electrical connector 604 from the rotor 206. The resolver cover 608 may be fastened to the first side 370 of the motor cover 214 in any suitable manner, such as with one or more fasteners 610, such as screws.

As is best shown in FIG. 6, the resolver 600 may be axially positioned between the motor cover 214 and a seal carrier plate 620. The seal carrier plate 620 may be spaced apart from the resolver 600. The seal carrier plate 620, which is also shown in FIGS. 11 and 18, may generally be configured as a hollow circular disc that may extend around the first axis 70. As is best shown in FIG. 6, the seal carrier plate 620 may extend further toward the first axis 70 and further away from the first axis 70 than the resolver 600.

Referring to FIGS. 6, 11 and 18, the seal carrier plate 620 may be mounted to the motor cover 214. In at least one configuration, the seal carrier plate 620 may include a seal carrier plate hole 630, an outer surface 632, one or more fastener holes 634, and a seal carrier plate flange 636.

The seal carrier plate hole 630 may extend around the first axis 70. The seal carrier plate hole 630 may receive a portion of the rotor output flange 290 and an inner seal 640. The inner seal 640 may extend around the rotor output flange 290 and may extend from the seal carrier plate 620 to the second seal support surface 454 of the rotor output flange 290. As such, the rotor output flange 290 may separate the inner seal 640 from the sun gear of the gear reduction module 26.

The outer surface 632 may be disposed opposite the seal carrier plate hole 630. As such, the outer surface 632 may face away from the first axis 70.

One or more fastener holes 634 may extend through the seal carrier plate 620. The fastener holes 634 may be configured as through holes that may be positioned between the seal carrier plate hole 630 and the outer surface 632. Each fastener hole 634 may receive a fastener 642, such as a screw or bolt, that may secure the seal carrier plate 620 to the motor cover 214.

The seal carrier plate flange 636 may be disposed between the seal carrier plate hole 630 and the outer surface 632. The seal carrier plate flange 636 may extend toward the motor cover 214. In at least one configuration, the seal carrier plate flange 636 may be configured as a ring that may extend continuously around the first axis 70. The seal carrier plate flange 636 may support an outer seal 644. The outer seal 644 may have any suitable configuration. For example, the outer seal 644 may be configured as an O-ring. The outer seal 644 may extend around the seal carrier plate flange 636 and may extend from the seal carrier plate flange 636 to the motor cover 214 when the seal carrier plate 620 is mounted on the motor cover 214.

Providing a resolver 600 and a seal carrier plate 620 that are accessible from the outside of the electric motor module 24 may simplify assembly as compared to a configuration in which the resolver 600 is positioned on the opposite side of the motor cover 214. In a configuration where the resolver is positioned on the side of the motor cover 214 that faces toward the rotor 206, the resolver would be susceptible to falling into the electric motor module 24 when unfastened. Moreover, if a curable adhesive or sealant was provided between the resolver 600 and the motor cover 214 then the resolver would need to be adjusted to its final rotational position before the adhesive or sealant cures or solidifies. The configuration described above may eliminate such adhesives or sealants and may provide easier access to the resolver 600 and the seal carrier plate 620.

An example of an assembly sequence for the resolver 600 and the seal carrier plate 620 is as follows.

First, the differential carrier 42 may be provided. The differential carrier 42 may be provided with the drive pinion 22 assembled to the differential carrier 42 and rotatably supported on the first and second drive pinion bearings 150, 170.

Second, the electric motor module 24 may be assembled to the differential carrier 42. Assembling the electric motor module 24 to the differential carrier 42 may include mounting the rotor 206 on the bearing support wall 64 of the differential carrier 42 and mounting the subassembly that includes the motor housing 200, the coolant jacket 202, and the stator 204 to the differential carrier 42. The motor cover 214 may also be mounted to the motor housing 200 as previously described. The rotor output flange 290 may be mounted on the rotor 206 before the motor cover 214 is mounted to the motor housing 200. Similarly, the resolver 600 and the resolver cover 608 may be mounted to the motor cover 214 before the motor cover 214 is mounted to the motor housing 200. The drive pinion 22 and the rotor output flange 290 may extend through the motor cover opening 374 and the resolver 600 after the motor cover 214 is installed.

Third, the rotational position of the resolver 600 may be assessed and adjusted if necessary. The rotational position of the resolver 600 with respect to the first axis 70 may not be precisely aligned with the rotational position of the rotor 206 when the motor cover 214 is mounted to the motor housing 200. The rotational position of the resolver 600 may be assessed in a manner known by those skilled in the art. For example, the rotor 206 may be rotated about the first axis 70, which may also rotate the rotor output flange 290 and the rotary disc 466, and the rotational position of the rotor 206 and the rotary disc 466 then may be synchronized with the resolver 600. The rotor 206 may be rotated manually, such as by turning the rotor output flange 290, or electrically. The rotational position of the resolver 600 may be adjusted by loosening the fasteners 606 (but not necessarily removing the fasteners 606 from the motor cover 214) to permit the resolver 600 to be rotated about the first axis 70 and with respect to the fasteners 606 via the elongated slots 602. Once the resolver 600 is properly aligned, then the fasteners 606 may be tightened to secure the resolver 600 and inhibit rotation of the resolver about the first axis 70.

Fourth, the seal carrier plate 620 may be mounted to the motor cover 214 after the resolver 600 is secured. The seal carrier plate 620 may be mounted and secured with the fasteners 642 and may include the inner seal 640 and the outer seal 644.

Gear Reduction Module

Referring to FIG. 2, the gear reduction module 26, if provided, may transmit torque from the electric motor module 24 to the differential assembly 30. As such, the gear reduction module 26 may be operatively connected to the electric motor module 24 and the differential assembly 30. The gear reduction module 26 may be disposed outside of the differential carrier 42 and may be primarily disposed outside of the electric motor module 24, thereby providing a modular construction that may be mounted to the electric motor module 24 when gear reduction is desired. Such a configuration may facilitate standardized configurations of the differential carrier 42 and/or the electric motor module 24.

The gear reduction module 26 may be disposed adjacent to the motor cover 214. In addition, the gear reduction module 26 may be primarily received or at least partially received in a shift mechanism housing 900 that may be mounted to the motor cover 214 as will be discussed in more detail below.

Figure 12:
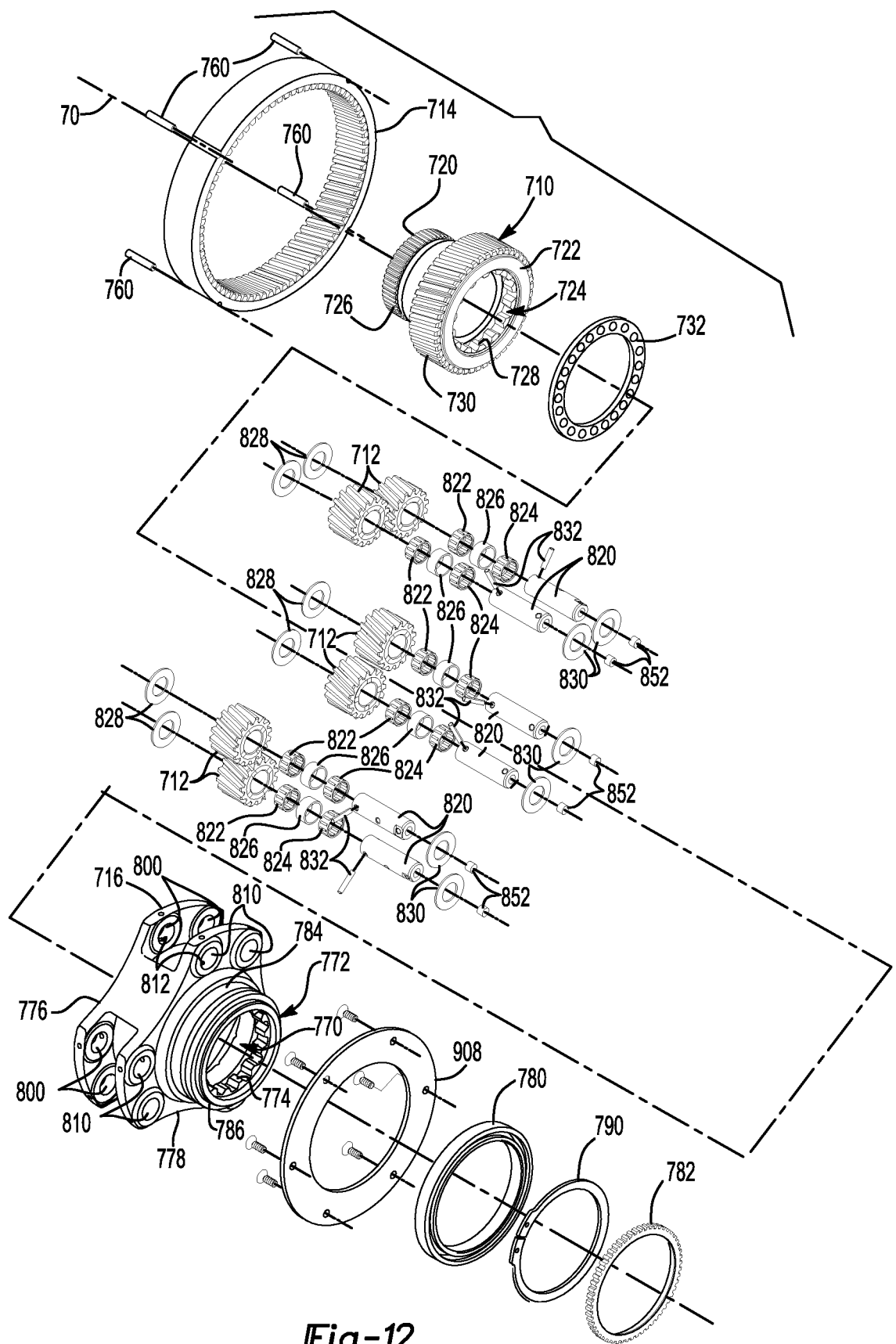
Figure 19:
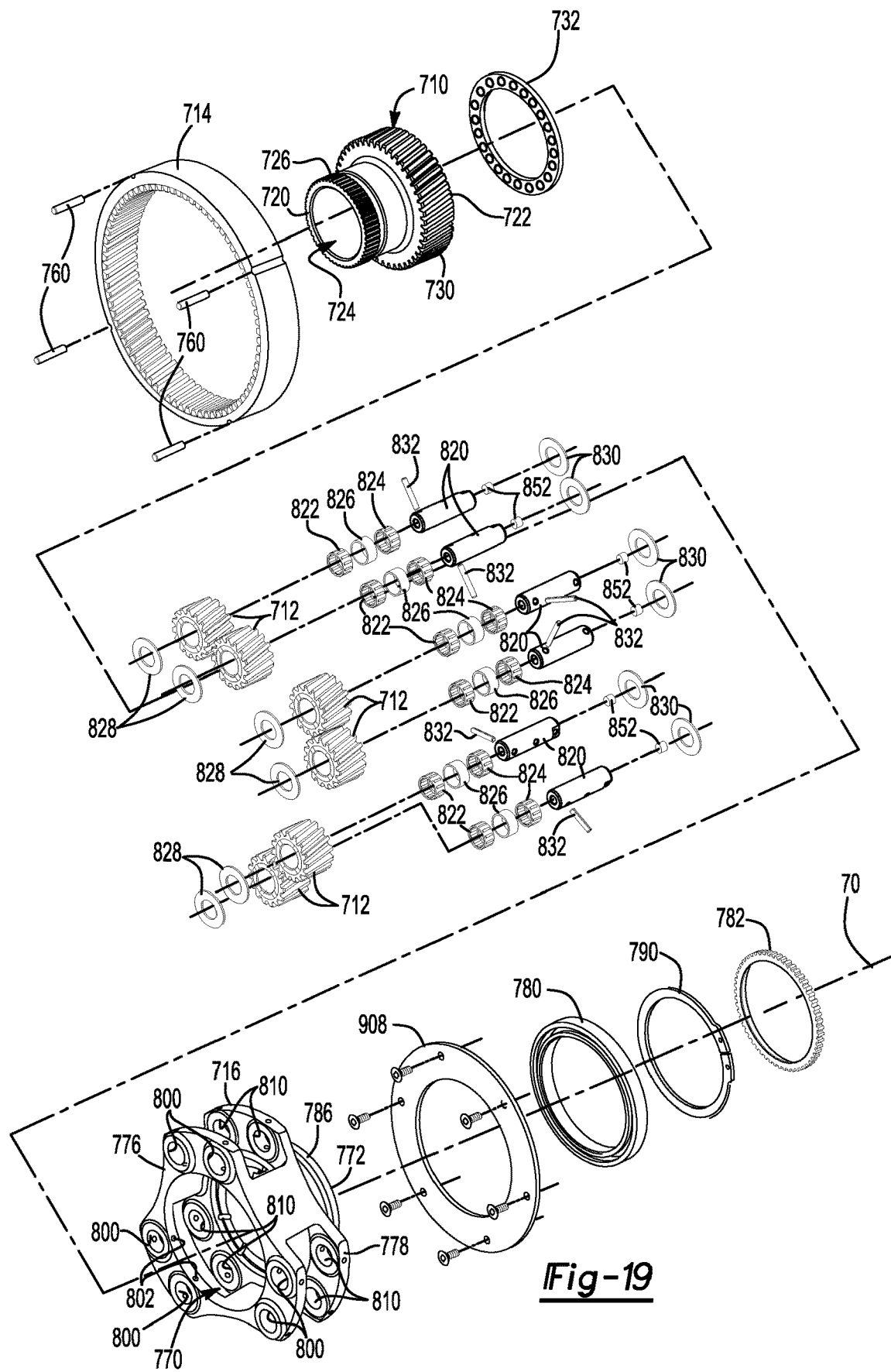

The gear reduction module 26 may be provided in various configurations, such as planetary gear set configurations and non-planetary gear set configurations. Referring to FIGS. 2, 12 and 19, an example of a gear reduction module 26 that has a planetary gear set 700 is shown. In such a configuration, the gear reduction module 26 may include a sun gear 710, planet gears 712, a planetary ring gear 714, and a planet gear carrier 716. The planetary gear set 700 will primarily be described in the context of an axle assembly that may include an electric motor module 24; however, it is to be understood that the planetary gear set 700 described below may be provided with axle assemblies that do not have an electric motor module. For example, the planetary gear set 700 may be configured as an interaxle differential unit or may be used to provide gear reduction at a wheel end.

Referring to FIGS. 6, 12 and 19, the sun gear 710 may be disposed proximate the center of the planetary gear set 700 and may be rotatable about the first axis 70. The sun gear 710 may be operatively connectable to the electric motor module 24. In addition, the sun gear 710 may extend into the motor cover opening 374 of the motor cover 214. As is best shown primarily with reference to FIGS. 12 and 19, the sun gear 710 may be a hollow tubular body that may include a first end surface 720, a second end surface 722, a sun gear hole 724, a sun gear spline 726, a first gear portion 728, and a second gear portion 730.

The first end surface 720 may be disposed at an end of the sun gear 710 that may face toward the axle housing 40. The first end surface 720 may extend into the motor cover opening 374.

The second end surface 722 may be disposed at an end of the sun gear 710 that may face away from the axle housing 40. As such, the second end surface 722 may be disposed opposite the first end surface 720. The second end surface 722 may be disposed outside of the motor cover opening 374 and inside the shift mechanism housing 900. A thrust bearing 732 may extend from the second end surface 722 to the planet gear carrier 716 to help inhibit axial movement of the sun gear 710 and facilitate rotation of the sun gear 710 with respect to the planet gear carrier 716.

The sun gear hole 724 may extend from the first end surface 720 to the second end surface 722. The sun gear hole 724 may extend along and may be centered about the first axis 70. The drive pinion 22 may extend through the sun gear hole 724 and may be spaced apart from the sun gear 710.

The sun gear spline 726 may facilitate coupling of the sun gear 710 to a rotor output flange 290. In at least one configuration, the sun gear spline 726 may be disposed opposite the sun gear hole 724 and may extend from or may be disposed proximate the first end surface 720. As such, the sun gear spline 726 may be received inside the rotor output flange 290 and may mesh with the rotor output flange spline 440. It is also contemplated that the sun gear spline 726 may be disposed in the sun gear hole 724 and the rotor output flange 290 may be received inside the sun gear 710.

The first gear portion 728 may be disposed in the sun gear hole 724. For example, the first gear portion 728 may be disposed proximate the second end surface 722 of the sun gear 710. Teeth of the first gear portion 728 may be arranged around the first axis 70 and may extend toward the first axis 70 and may be configured to mesh with teeth of a shift collar 904 as will be discussed in more detail below.

The second gear portion 730 may be disposed opposite the first gear portion 728. The second gear portion 730 may be disposed proximate the second end surface 722 of the sun gear 710. The second gear portion 730 may have teeth that may mesh with teeth of the planet gears 712. The teeth of the second gear portion 730 may be arranged around the first axis 70 and may extend away from the first axis 70.

The planet gears 712 may be rotatably disposed between the sun gear 710 and the planetary ring gear 714. Each planet gear 712 may have a hole and a set of teeth. The hole may be a through hole that may extend through the planet gear 712. The set of teeth may be disposed opposite the hole. The set of teeth may mesh with teeth of the second gear portion 730 of the sun gear 710 and teeth on the planetary ring gear 714. The teeth may have any suitable configuration. In the configuration shown, the teeth are provided with a helical configuration however, other tooth configurations may be provided. Each planet gear 712 may be configured to rotate about a different planet gear axis of rotation. The planet gear axes of rotation may extend substantially parallel to the first axis 70.

Figure 25:
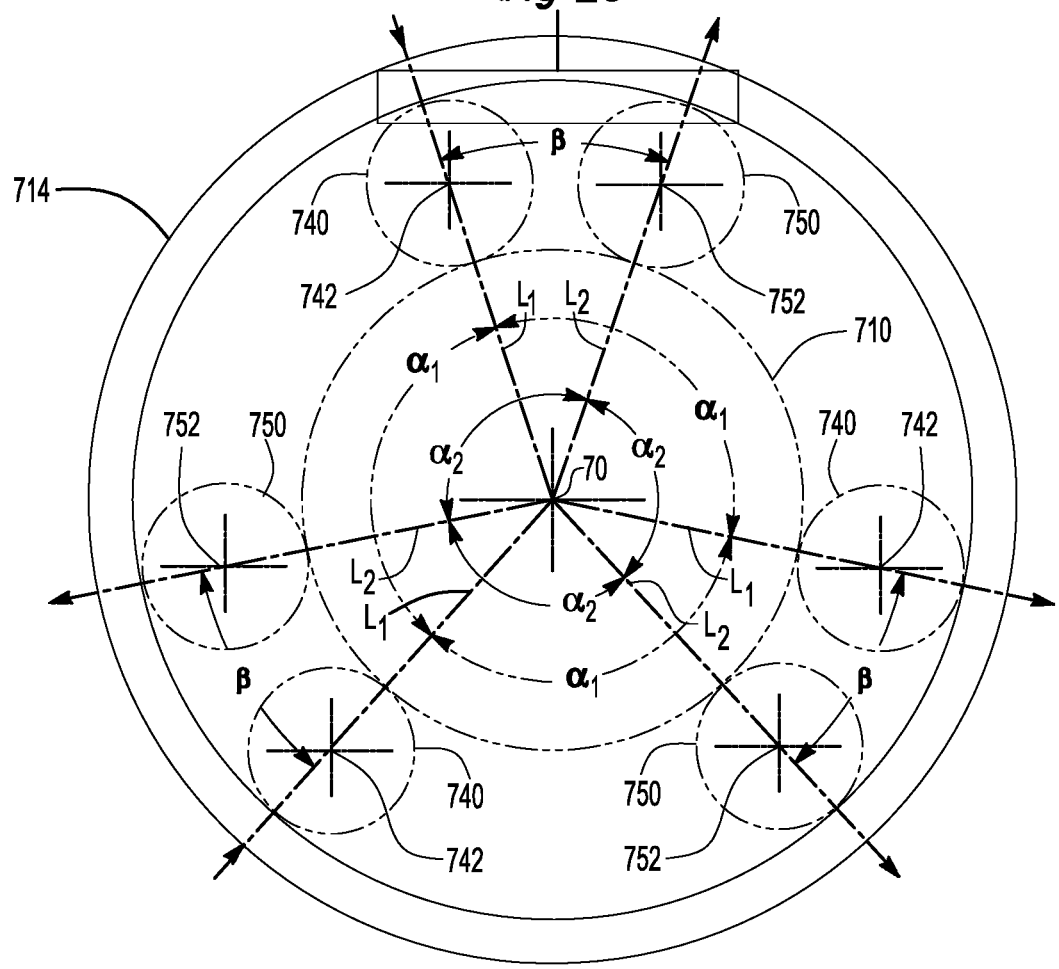
FIG. 25 illustrates a planetary gear set that may be provided with a gear reduction module.

Referring to FIG. 25, the planet gears 712 may be grouped into two sets. These sets may be referred to as a first set of planet gears 740 and a second set of planet gears 750. The first set of planet gears 740 and the second set of planet gears 750 may have individual planet gears that may have the same configuration.

The first set of planet gears 740 may include multiple planet gears that mesh with the sun gear 710 and the planetary ring gear 714. For example, the first set of planet gears 740 may have n members, where n is an integer greater than 1. The members of the first set of planet gears 740 may have the same configuration, may be spaced apart from each other, and may be arranged around the first axis 70 in a repeating relationship. For instance, the members of the first set of planet gears 740 may be equidistantly spaced around the first axis 70 with respect to each other. Each member of the first set of planet gears 740 may be arranged around the first axis 70 at an angle $\alpha_1$ with respect to each other. For instance, if n=3, then $\alpha_1$=120°; if n=4, then $\alpha_1$ equals 90°, and so on. The axes of rotation of each member of the first set of planet gears 740, which may also be referred to as a first planet gear axis 742, may be positioned at a substantially constant radial distance from the first axis 70.

Each member of the first set of planet gears 740 may be arranged or positioned between two members of the second set of planet gears 750. In at least one configuration, each member of the first set of planet gears 740 may be positioned closer to one member of the second set of planet gears 750 than all other members of the second set of planet gears 750. This may result in the planet gears appearing to be grouped in pairs that include one member of the first set of planet gears 740 and one member of the second set of planet gears 750.

Figure 26:
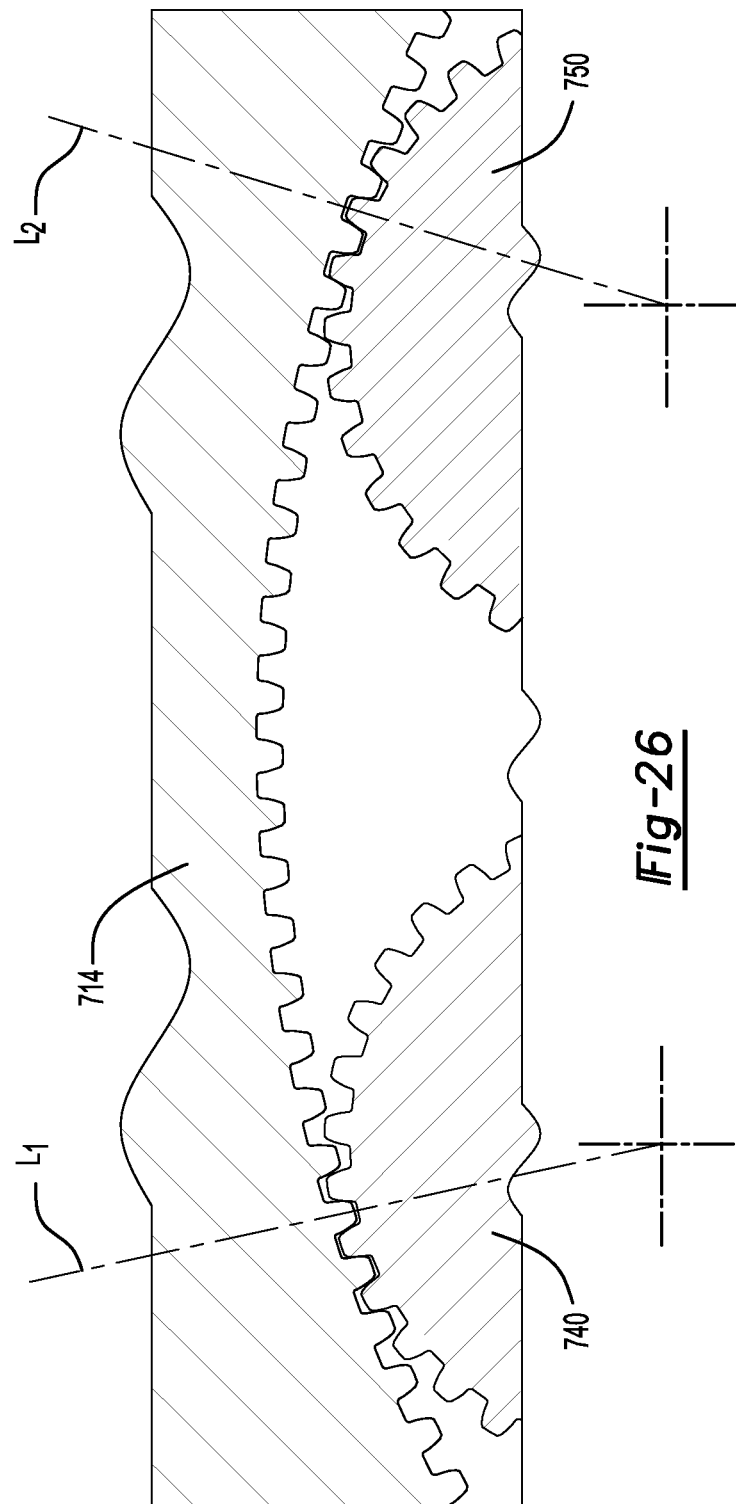
FIG. 26 is a magnified view of a portion of FIG. 25.

Each member of the first set of planet gears 740 may be disposed "in-phase" with each other. As such, each member of the first set of planet gears 740 may be provided at a common rotational position or rotational orientation with respect to the planetary ring gear 714. Thus, the members of first set of planet gears 740 may have common meshing relationships with the planetary ring gear 714. For example, each member of the first set of planet gears 740 may be positioned such that a corresponding tooth of the planetary ring gear 714 is received between and is centered between two adjacent teeth of the planet gear. Such positioning is represented in FIG. 25 by triangles that extend from the planetary ring gear 714 toward the first axis 70. A magnified illustration of such positioning is shown in FIG. 26 in which the planetary ring gear tooth that is received between and centered between adjacent teeth of a member of the first set of planet gears 740. In at least one configuration, the planetary ring gear tooth that is received between and centered between adjacent teeth of a member of the first set of planet gears 740 may positioned along a radial line L1 that may extend through the first axis 70 and through a corresponding first planet gear axis 742 about which a member of the first set of planet gears 740 may rotate. The planetary ring gear tooth or a cross section of the planetary ring gear tooth may be centered about the radial line L1. In-phase positioning along with equidistant spacing of the members of the first set of planet gears 740 may help cancel radial vibration excitations.

The second set of planet gears 750 may also include multiple planet gears that mesh with the sun gear 710 and the planetary ring gear 714. For example, the second set of planet gears 750 may have n members, where n is an integer greater than 1. The members of second set of planet gears 750 may have the same configuration, may be spaced apart from each other, and may be arranged around the first axis 70 in a repeating relationship. For instance, the second set of planet gears 750 may be equidistantly spaced around the first axis 70 with respect to each other. Each member of the second set of planet gears 750 may be arranged around the first axis 70 at an angle $\alpha_2$ with respect to each other. Angle $\alpha_1$ may equal angle $\alpha_2$. The axes of rotation of each member of the second set of planet gears 750 which may also be referred to as a second planet gear axis 752, may be positioned at a substantially constant radial distance from the first axis 70. In addition, each member of the second set of planet gears 750 may be arranged or positioned between two members of the first set of planet gears 740. In at least one configuration, each member of the first set of planet gears 740 may be positioned closer to one member of the second set of planet gears 750 than all other members of the second set of planet gears 750. Members of the first set of planet gears 740 and members of the second set of planet gears 750 may not mesh with each other.

Each member of the second set of planet gears 750 may be disposed "in-phase" with each other and may be positioned in counterphase with respect to the first set of planet gears 740. For instance, each member of the second set of planet gears 750 may be provided at a common rotational position or rotational orientation with respect to the planetary ring gear 714. Thus, the members of second set of planet gears 750 may have common meshing relationships with the planetary ring gear 714. However, the members of the second set of planet gears 750 may not have common meshing relationships with the first set of planet gears 740. For example, each member of the second set of planet gears 750 may be positioned such that a tooth of each member of the second set of planet gears 750 is received between and is centered between two adjacent teeth of the planetary ring gear 714 when a planetary ring gear tooth is received between and is centered between two adjacent teeth of each member of the first set of planet gears 740. Such positioning is represented in FIG. 25 by triangles that extend from the members of the second set of planet gears 750 away from the first axis 70. A magnified illustration of such positioning is shown in FIG. 26 in which the planet gear tooth of the member of the second set of planet gears 750 that is received between and centered between adjacent teeth of the planetary ring gear 714 is positioned along a radial line L2 that may extend through the first axis 70 and through a corresponding second planet gear axis 752 about which a member of the second set of planet gears 750 may rotate. Counterphase positioning of the second set of planet gears 750 with respect to the first set of planet gears 740 may help cancel rotational vibration excitations. As a result, radial and rotational vibration excitations or torque ripples in the planetary gear set 700 may be substantially or fully cancelled. Moreover, the unequal distribution or angular positioning of the first set of planet gears 740 with respect to the second set of planet gears 750 may facilitate providing a stiffer planet gear carrier 716.

Referring to FIGS. 6, 12 and 19, the planetary ring gear 714 may extend around the first axis 70 and may receive the planet gears 712. The planetary ring gear 714 may include a set of planetary ring gear teeth that may extend toward the first axis 70 and may mesh with teeth on the planet gears 712. The planetary ring gear 714 may be stationary with respect to the first axis 70. For example, the planetary ring gear 714 may be received in and may be fixedly disposed on the shift mechanism housing 900. In at least one configuration, a plurality of pins 760 may be partially received in grooves located along the outside circumference of the planetary ring gear 714 and may be partially received in corresponding grooves in the shift mechanism housing 900 to inhibit rotation of the planetary ring gear 714.

The planet gear carrier 716 may be rotatable about the first axis 70 and may rotatably support the planet gears 712. In at least one configuration, the planet gear carrier 716 may include a planet gear carrier hole 770, a planet gear carrier ring 772, a planet gear carrier gear portion 774, a first planet gear carrier flange 776, and a second planet gear carrier flange 778.

The planet gear carrier hole 770 may be a through hole that may extend through planet gear carrier 716. The planet gear carrier hole 770 may extend along and may be centered about the first axis 70.

The planet gear carrier ring 772 may at least partially define the planet gear carrier hole 770. The planet gear carrier ring 772 may extend around the first axis 70 and may extend in an axial direction away from the second flange. The planet gear carrier ring 772 may be configured to support a support bearing 780 and a tone ring 782. For example, the planet gear carrier ring 772 may include a bearing mounting surface 784 and a tone ring mounting surface 786.

The bearing mounting surface 784 may face away from the first axis 70 and may extend around the first axis 70. The bearing mounting surface 784 may be axially positioned between the second planet gear carrier flange 778 and a distal end of the planet gear carrier ring 772. An inner race of the support bearing 780 may receive and may be disposed on the bearing mounting surface 784. The support bearing 780 may rotatably support the planet gear carrier 716 on the shift mechanism housing. A fastener 790, such as a snap ring, may be received in a groove in the planet gear carrier ring 772 to inhibit axial movement of the support bearing 780.

The tone ring mounting surface 786 may also face away from the first axis 70 and may extend around the first axis 70. The tone ring mounting surface 786 may extend from the distal end of the planet gear carrier ring 772 or may be disposed between the distal end of the planet gear carrier ring 772 in the bearing mounting surface 784. The tone ring 782 may have a plurality of teeth and may receive and may be disposed on the tone ring mounting surface 786.

The planet gear carrier gear portion 774 may be disposed in the planet gear carrier ring 772 and may extend into the planet gear carrier hole 770. Teeth of the planet gear carrier gear portion 774 may be arranged around the first axis 70 and may extend toward the first axis 70.

The first planet gear carrier flange 776, which may also be referred to as a first flange, may be disposed opposite the planet gear carrier ring 772. The first planet gear carrier flange 776 may extend away from the first axis 70. The first planet gear carrier flange 776 may include a plurality of openings 800 and a set of fastener holes 802.

The openings 800 may facilitate mounting of the planet gears 712 as will be discussed in more detail below. The openings 800 may be configured as through holes.

Referring to FIGS. 6 and 19, a fastener hole 802 may extend to the opening 800. In at least one configuration, the fastener holes 802 may extend along radial lines with respect to the first axis 70.

Referring to FIGS. 6, 12 and 19, the second planet gear carrier flange 778, which may also be referred to as a second flange, may be spaced apart from the first planet gear carrier flange 776. The second planet gear carrier flange 778 may be axially positioned between the first planet gear carrier flange 776 and the planet gear carrier ring 772. The second planet gear carrier flange 778 may extend away from the first axis 70 and may have a similar configuration as the first planet gear carrier flange 776. The second planet gear carrier flange 778 may include a plurality of openings 810 and a set of lubricant holes 812.

The openings 810 in the second planet gear carrier flange 778 may be aligned with a corresponding opening 800 in the first planet gear carrier flange 776. The openings 800, 810 may facilitate mounting of the planet gears 712 between the first planet gear carrier flange 776 and the second planet gear carrier flange 778.

A lubricant hole 812 may extend through the second planet gear carrier flange 778 to each opening 800. In at least one configuration, the lubricant holes 812 may extend along radial lines with respect to the first axis 70. It is also contemplated that the positioning of some or all of the lubricant holes 812 and the fastener holes 802 may be interchanged between the first planet gear carrier flange 776 and the second planet gear carrier flange 778.

Various components may facilitate mounting of a planet gear 712. These components may include one or more planet pins 820 and one or more of a first roller bearing assembly 822, a second roller bearing assembly 824, a spacer 826, a first washer 828, a second washer 830, and a securing pin 832.

A planet pin 820 may rotatably support each planet gear 712. The planet pin 820 may extend from the first planet gear carrier flange 776 to the second planet gear carrier flange 778. For example, a planet pin 820 may extend into or through the hole in a corresponding planet gear 712 and into or through an opening 800 in the first planet gear carrier flange 776 and an opening 810 in the second planet gear carrier flange 778. As such, the planet pins 820 may not be cantilevered from the planet gear carrier 716. Moreover, the planet pins 820 may be substantially rigid and may not deflect with respect to a corresponding planet gear axis, such as a first planet gear axis 742 or a second planet gear axis 752. In addition, each planet pin 820 may have a securing pin hole 840, an axial bore 842, a first connection passage 844, and a second connection passage 846 as is best shown in FIG. 6.

The securing pin hole 840 may partially or completely through the planet pin 820. A securing pin 832 may be received in the securing pin hole 840 and may be received in a fastener hole 802 of the first planet gear carrier flange 776 to help inhibit axial movement of a planet pin 820 with respect to the planet gear carrier 716. The securing pins 832 may have any suitable configuration.

The axial bore 842 may extend in an axial direction from an end of the planet pin 820. The axial bore 842 may be a blind hole in one or more embodiments. A plug 852 may be received in an end of the axial bore 842 to help direct lubricant flow as will be discussed in more detail below. The plugs 852 may have any suitable configuration. For instance, the plugs 852 may be configured as set screws.

The first connection passage 844 may extend from the axial bore 842 to the spacer 826. As such, the first connection passage 844 may be disposed near the center of a planet pin 820.

The second connection passage 846 may be spaced apart from the first connection passage 844. The second connection passage 846 and may extend from the axial bore 842 to a lubricant hole 812 in the second planet gear carrier flange 778. The second connection passage 846 may be disposed adjacent to a plug 852.

Referring to FIGS. 6, 12 and 19, the first roller bearing assembly 822 and the second roller bearing assembly 824 may receive a planet pin 820 and may be received inside a corresponding planet gear 712. The first roller bearing assembly 822 and the second roller bearing assembly 824 may rotatably support the planet gear 712.

The spacer 826 may receive a planet pin 820 and may be axially positioned between the first roller bearing assembly 822 and the second roller bearing assembly 824. The spacer 826 may have a larger inside diameter than the outside diameter of the planet pin 820 to allow lubricant to flow inside the spacer 826 to help lubricate the first roller bearing assembly 822 and the second roller bearing assembly 824.

The first washer 828 and the second washer 830 may receive a planet pin 820. The first washer 828 may extend from the first planet gear carrier flange 776 to the first roller bearing assembly 822. The second washer 830 may extend from the second planet gear carrier flange 778 to the second roller bearing assembly 824. As such, the first washer 828 and the second washer 830 may cooperate to inhibit axial movement of the planet gear 712, the first roller bearing assembly 822, the second roller bearing assembly 824, or combinations thereof.

Shift Mechanism

Referring to FIG. 2, the shift mechanism 28 may be disposed at an end of the axle assembly 10 that may be disposed opposite the axle housing 40. The shift mechanism 28 may be disposed on the motor cover 214.

The gear reduction module 26 may cooperate with the shift mechanism 28 to provide a desired gear reduction ratio to change the torque provided from the electric motor module 24 to the differential assembly 30, and hence to the axle shafts 32 of the axle assembly 10. For example, the gear reduction module 26 may provide a first drive gear ratio and a second drive gear ratio. The first drive gear ratio, which may be referred to as a low range gear ratio, may provide gear reduction from the electric motor module 24 to the differential assembly 30 and hence to the axle shafts 32. As a nonlimiting example, the first drive gear ratio may provide a 2:1 gear ratio or more. The first drive gear ratio may provide increased torque to a vehicle traction wheel as compared to the second drive gear ratio.

The second drive gear ratio, which may be referred to as a high range gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy.

In addition, a neutral position or neutral drive gear ratio may be provided in which torque may not be provided to the differential assembly 30 by the electric motor module 24. As such, torque may not be transmitted between the gear reduction module 26 and the drive pinion 22 when a shift collar is in the neutral position.

Figure 13:
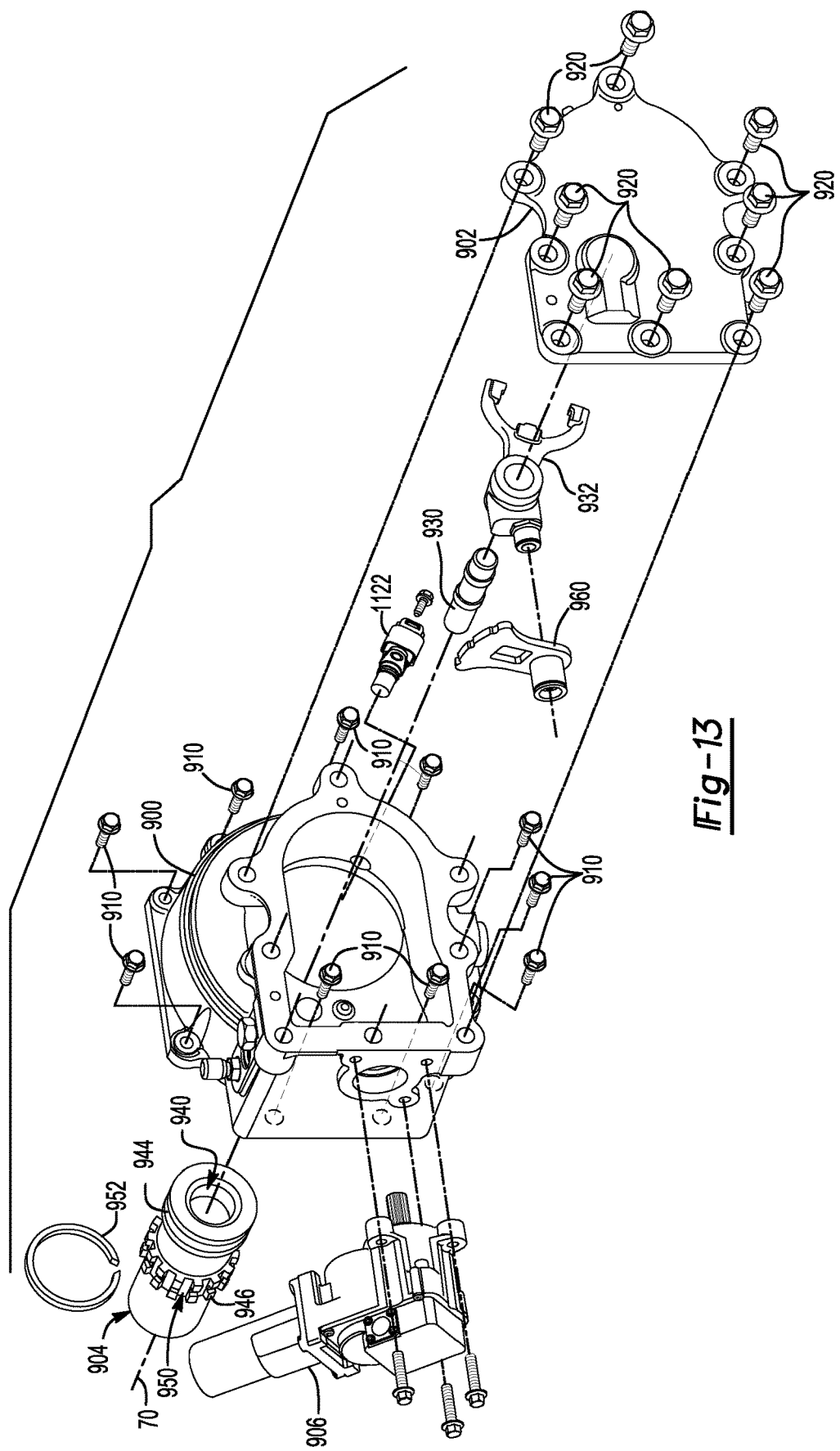
Figure 20:
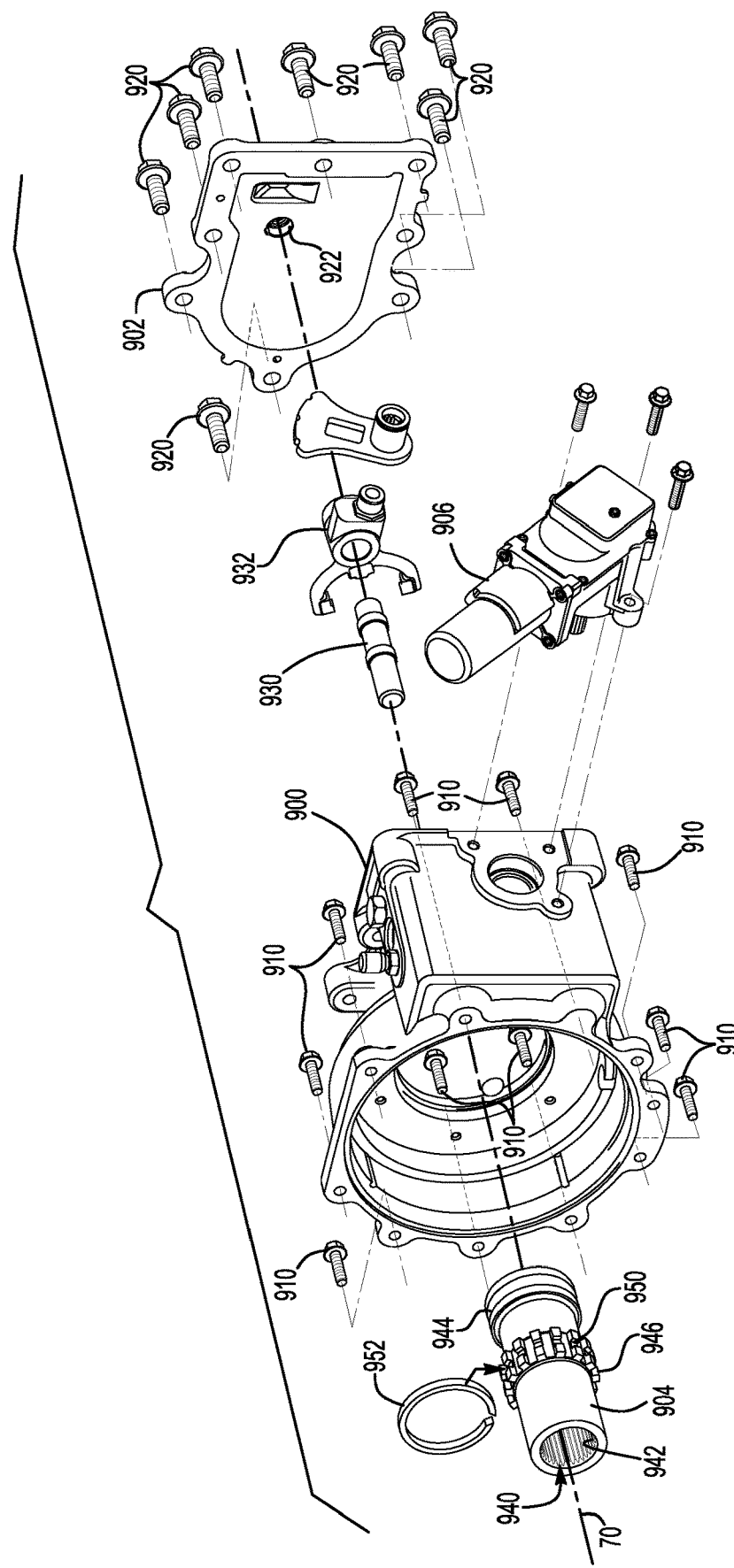

Referring to FIGS. 2, 13 and 20, the shift mechanism 28 may include a shift mechanism housing 900, an end plate 902, a shift collar 904, and an actuator 906.

The shift mechanism housing 900 may be disposed on the motor cover 214 and may be mounted to a side of the motor cover 214 that may be disposed opposite the differential carrier 42. For example, the shift mechanism housing 900 may be mounted to the motor cover 214 with one or more fasteners 910, such as bolts. The shift mechanism housing 900 may at least partially receive the gear reduction module 26. In addition, the shift mechanism housing 900 may facilitate mounting of the actuator 906 and may at least partially receive the shift collar 904. As is best shown in FIG. 6, the shift mechanism housing 900 may rotatably support the planet gear carrier 716 via the support bearing 780. A retainer 908 may be mounted to the shift mechanism housing 900 to inhibit axial movement of the support bearing 780. In at least one configuration, the retainer 908 may engage an outer race of the support bearing 780 to inhibit axial movement toward the motor cover 214.

The end plate 902, which may also be referred to as an end cap, may be disposed on an end of the shift mechanism housing 900 that may be disposed opposite the axle housing 40. For example, the end plate 902 may be mounted to the shift mechanism housing 900 with a plurality of fasteners 920, such as bolts. The end plate 902 may help support the actuator 906. For example, the end plate 902 may have a support feature 922 that may support a shaft 930 that may support and facilitate axial movement of a shift fork 932 as will be discussed in more detail below. The shaft 930 may also be supported by the shift mechanism housing 900.

The shift collar 904 may be at least partially received in the shift mechanism housing 900. For instance, the shift collar 904 may be at least partially received in the shift mechanism housing 900 and may extend through components of the gear reduction module 26, such as the planet gear carrier 716. In at least one configuration such as is best shown in FIGS. 13 and 20, the shift collar 904 may include a shift collar hole 940, a shift collar spline 942, a shift collar groove 944, and a shift collar gear 946.

The shift collar hole 940 may extend through the shift collar 904 and may extend around the first axis 70. The shift collar hole 940 may receive the shaft portion 122 of the drive pinion 22.

Referring to FIG. 20, the shift collar spline 942 may be disposed in the shift collar hole 940 and may be axially positioned near a first end of the shift collar 904 that may face toward the differential carrier 42. The shift collar spline 942 may extend toward the first axis 70 and may mate with the spline 140 of the drive pinion 22. The mating splines may allow the shift collar 904 to move in an axial direction or along the first axis 70 while inhibiting rotation of the shift collar 904 about the first axis 70 with respect to the drive pinion 22. Thus, the shift collar 904 may be rotatable about the first axis 70 with the drive pinion 22.

The shift collar groove 944 may be disposed proximate a second end of the shift collar 904 that may face toward the end plate 902. The shift collar groove 944 may face away from the first axis 70 and may extend around the first axis 70. The shift collar groove 944 may receive the shift fork 932, which may operatively connect the shift collar 904 to the actuator 906.

The shift collar gear 946 may be disposed between the first end and the second end of the shift collar 904. The shift collar gear 946 may have teeth that may be arranged around the first axis 70 and that may extend away from the first axis 70. An annular groove 950 that may extend around the first axis 70 may be provided in the shift collar gear 946. The annular groove 950 may receive a stop 952 that may limit axial movement of the shift collar 904. The stop 952 may have any suitable configuration. For instance, the stop 952 may include one or more snap rings.

The shift collar 904 may be movably disposed on the drive pinion 22. The shift collar 904 may selectively engage a gear ratio. More specifically, the shift collar 904 may move axially or in a direction that extends along the first axis 70 between a first position, a second position, and a third position. These positions are illustrated in FIGS. 2-4.

Referring to FIG. 2 as well as the magnified portion of FIG. 2 shown in FIG. 6, the shift collar 904 is shown in the first position. In the first position, the shift collar 904 may couple the planet gear carrier 716 to the drive pinion 22. For example, the teeth of the shift collar gear 946 may mesh with the teeth of the planet gear carrier gear portion 774 of the planet gear carrier 716. As such, torque that is provided by the electric motor module 24 may be transmitted through the rotor output flange 290, sun gear 710, planet gears 712, and planet gear carrier 716 to the shift collar 904 and from the shift collar 904 to the drive pinion 22.

Referring to FIG. 3, the shift collar 904 is shown in a second position or neutral position. The second position may be axially positioned between the first position and the third position. In the second position, the shift collar 904 may not couple the gear reduction module 26 to the drive pinion 22. For example, the teeth of the shift collar gear 946 may not mesh with the teeth of the sun gear 710 or the planet gear carrier 716. As such, torque that is provided by the electric motor module 24 may not be transmitted to the shift collar 904 or the drive pinion 22. The shift collar 904 may be disposed closer to the axle housing 40 when in the second position than when in the first position.

Figure 4:
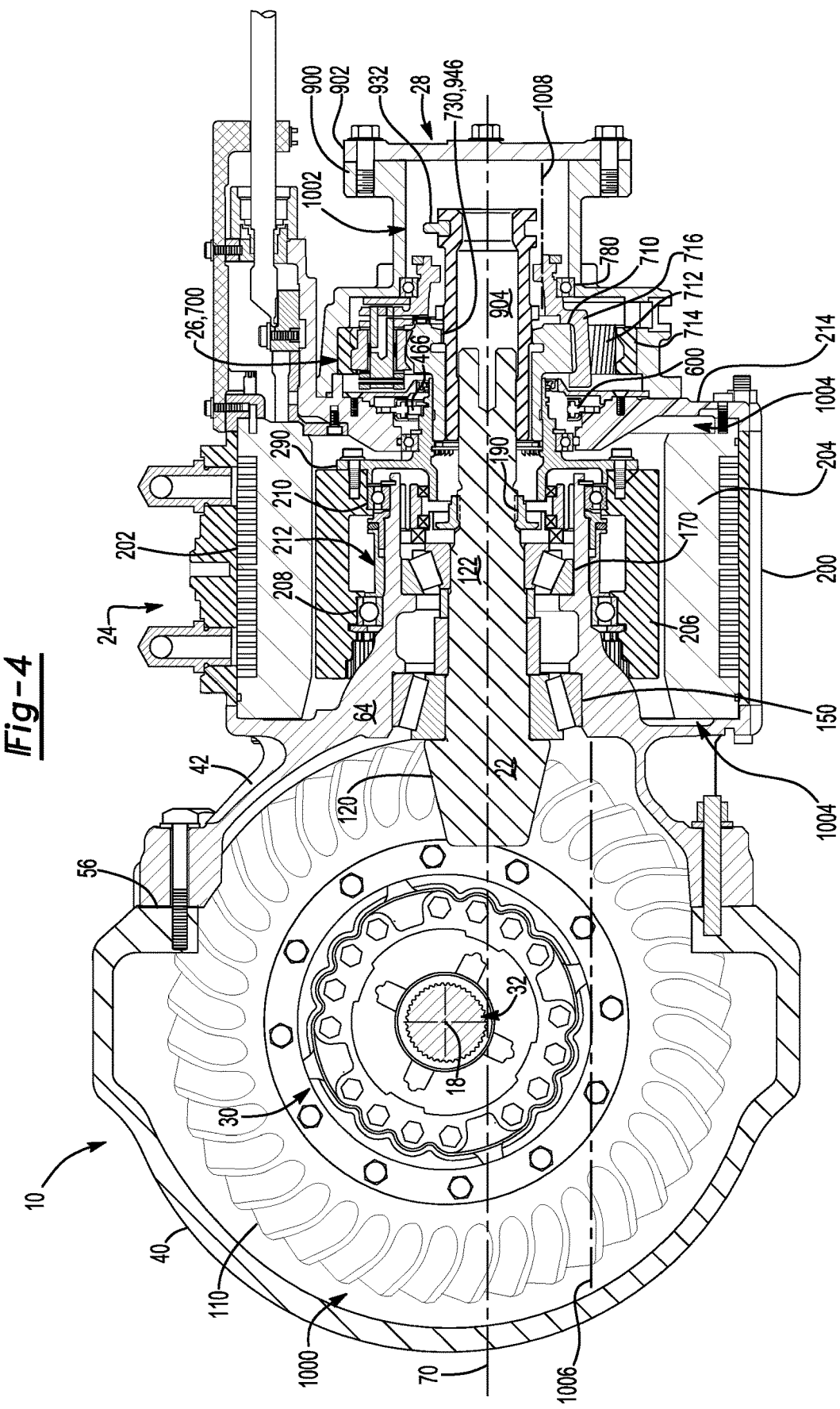
FIG. 4 is a section view of the axle assembly showing the shift collar in a third position.

Referring to FIG. 4, the shift collar 904 is shown in the third position. In the first position, the shift collar 904 may couple the sun gear 710 to the drive pinion 22. For example, the teeth of the shift collar gear 946 may mesh with the teeth of the second gear portion 730 of the sun gear 710. As such, torque that is provided by the electric motor module 24 may be transmitted through the rotor output flange 290 and sun gear 710 to the shift collar 904 and from shift collar 904 to the drive pinion 22. The shift collar 904 may be disposed closer to the axle housing 40 when in the third position than when in the second position.

It is also contemplated that the shift collar may be omitted such that the gear reduction module may provide a single gear ratio rather than multiple gear ratios. For example, the planet gear carrier 716 may be coupled to the drive pinion 22 to provide a low range gear ratio without a high range gear ratio.

The actuator 906 may be disposed on the shift mechanism housing 900. The actuator 906 may move the shift collar 904 along the first axis 70 between the first, second, and third positions. For example, the actuator 906 may have an output shaft that may be rotatable about an axis. A cam 960 may be mounted to the output shaft and may rotate with the output shaft. The cam 960 may operatively connect the actuator 906 to the shift fork 932. As such, rotation of the output shaft may actuate the shift fork 932 along the shaft 930, which in turn may move the shift collar 904 along the first axis 70. The actuator 906 may be of any suitable type. For example, the actuator 906 may be an electrical, electromechanical, pneumatic or hydraulic actuator.

Lubricant Chambers

Referring to FIG. 4, the axle assembly 10 may be divided into three main chambers. These chambers may include a first lubricant chamber 1000, a second lubricant chamber 1002, and an air chamber 1004.

The first lubricant chamber 1000 may be primarily defined by the axle housing 40 and the differential carrier 42. More specifically, the first lubricant chamber 1000 may be disposed between the axle housing 40 and the differential carrier 42 and may be disposed inside a majority of the bearing support wall 64. As such, the first lubricant chamber 1000 may receive the differential assembly 30, the gear portion 120 of the drive pinion 22, part of the shaft portion 122 of the drive pinion 22, the first drive pinion bearing 150, and the second drive pinion bearing 170. In addition, the first lubricant chamber 1000 may receive a first lubricant 1006. The first lubricant 1006 may be a high shear oil, such as 75W90 gear oil.

The second lubricant chamber 1002 may be primarily defined by the motor cover 214, rotor output flange 290, the shift mechanism housing 900, and the end plate 902. More specifically, the second lubricant chamber 1002 may be disposed inside a majority of the rotor output flange 290, motor cover 214, and the shift mechanism housing 900. As such, the second lubricant chamber 1002 may receive the preload nut 190, part of the shaft portion 122 of the drive pinion 22, the planetary gear set 700, and the shift collar 904. The second lubricant chamber 1002 may receive a second lubricant 1008. The second lubricant 1008 may be a different type or grade of lubricant than the first lubricant 1006. For example, the second lubricant 1008 may be Emgard® MTF7000 40W gear oil, which may provide lower frictional loss properties and cost benefits.

The air chamber 1004 may be primarily defined by the electric motor module 24 and the differential carrier 42. For example, the bearing support wall 64 may cooperate with the motor housing 200 and the motor cover 214 to at least partially define the air chamber 1004. As such, the air chamber 1004 may be primarily disposed in a radial direction between the bearing support wall 64 and the motor housing 200 and may be primarily disposed between the differential carrier 42 and the motor cover 214 in an axial direction. The air chamber 1004 may receive components such as the coolant jacket 202, the stator 204, the rotor 206, the first rotor bearing assembly 208, the second rotor bearing assembly 210, rotor bearing preload module 212, the spigot bearing assembly 410, the rotary disc 466, and the resolver 600. A vent may be provided in the axle assembly 10 to permit the air chamber 1004 to fluidly communicate with the surrounding environment.

The first lubricant chamber 1000, the second lubricant chamber 1002, and the air chamber 1004 may be separated by various sealing components and may not be fluidly connected to each other. Such sealing components may include the seal support ring 180 and the inner seal 640 as previously discussed. In addition, sealing components may include a seal mounting ring 1010, a first seal 1012, a second seal 1014, and a third seal 1016, which are best shown with reference to FIGS. 5, 9 and 16.

The seal mounting ring 1010 may be positioned between the drive pinion 22 and the bearing support wall 64. As such, the seal mounting ring 1010 may be disposed in the hole 90 that may be defined by the bearing support wall 64. In addition, the seal mounting ring 1010 may be fixedly positioned with respect to the bearing support wall 64. For example, the seal mounting ring 1010 may be received in the hole 90 with an interference fit. The seal mounting ring 1010 may extend around and may be spaced apart from the seal support ring 180 and the first seal support surface 444 of the rotor output flange 290. In at least one configuration, the seal mounting ring 1010 may include a first side 1020, a second side 1022, an outer face 1024, and an inner face 1026.

The first side 1020 may face toward the second drive pinion bearing 170. The first side 1020 may be spaced apart from the second drive pinion bearing 170 in one or more embodiments.

The second side 1022 may be disposed opposite the first side 1020. As such, the second side 1022 may face toward the flange portion 432 of the rotor output flange 290.

The outer face 1024 may face away from the first axis 70. The outer face 1024 may extend from the first side 1020 to the second side 1022 and may engage the bearing support wall 64.

The inner face 1026 may be disposed opposite the outer face 1024. As such, the inner face 1026 may face toward the first axis 70. In at least one configuration, the inner face 1026 may have a stepped configuration that may include a first seal mounting surface 1030, a second seal mounting surface 1032, a third seal mounting surface 1034, and an intermediate surface 1036.

The first seal mounting surface 1030 may face toward and may extend around the seal support ring 180.

The second seal mounting surface 1032 may also face toward and may extend around the seal support ring 180 and may extend around the first axis 70. The second seal mounting surface 1032 may have a different diameter than the first seal mounting surface 1030. In the configuration shown, the second seal mounting surface 1032 may have a smaller diameter than the first seal mounting surface 1030.

The third seal mounting surface 1034 may face toward and may extend around the first seal support surface 444 of the rotor output flange 290. The third seal mounting surface 1034 may have a different diameter than the first seal mounting surface 1030. In the configuration shown, the third seal mounting surface 1034 may have a smaller diameter than the first seal mounting surface 1030.

The intermediate surface 1036 may be axially positioned between the second seal mounting surface 1032 and the third seal mounting surface 1034. The intermediate surface 1036 or a portion thereof may have a smaller diameter than the second seal mounting surface 1032, the third seal mounting surface 1034, or both. Such a configuration may help inhibit axial movement of seals that may be associated with the second seal mounting surface 1032 in the third seal mounting surface 1034.

The first seal 1012 may extend between the bearing support wall 64 and the drive pinion 22. For example, the first seal 1012 may extend from the first seal mounting surface 1030 to the seal support ring 180. The first seal 1012 may extend around the seal support ring 180 and may help separate the first lubricant chamber 1000 from the second lubricant chamber 1002.

The second seal 1014 may extend between the bearing support wall 64 and the rotor output flange 290. For example, the second seal 1014 may extend from the second seal mounting surface 1032 to the first seal support surface 444 of the rotor output flange 290. The second seal 1014 may extend around the rotor output flange 290 and may help separate the air chamber 1004 from the second lubricant chamber 1002.

The third seal 1016 may be axially positioned between the first seal 1012 and the second seal 1014. The third seal 1016 may extend between the bearing support wall 64 and the drive pinion 22. For example, the third seal 1016 may extend from the third seal mounting surface 1034 to the seal support ring 180. The third seal 1016 may extend around the seal support ring 180 and may help separate the first lubricant chamber 1000 from the second lubricant chamber 1002. The third seal 1016 may be spaced apart from the first seal 1012 such that a cavity 1040 may be disposed between the first seal 1012 and the third seal 1016. The cavity 1040 may be fluidly connected to the air chamber 1004. For instance, the cavity 1040 may be fluidly connected to the air chamber 1004 by at least one vent passage 1042 that may extend through the seal mounting ring 1010. For example, the vent passage 1042 may extend from the inner face 1026 of the seal mounting ring 1010 to the second side 1022 of the seal mounting ring 1010. As such, a portion of the vent passage 1042 may extend from the second side 1022 toward the first side 1020 but not to the first side 1020. In the configuration shown in FIG. 9, four vent passages 1042 shown that may be arranged at 900 intervals from each other; however, it is contemplated that a greater or lesser number of vent passages may be provided.

Referring to FIG. 6, the inner seal 640 may extend between the seal carrier plate 620 and the rotor output flange 290. For example, the inner seal 640 may be received in the seal carrier plate hole 630 and may extend from the seal carrier plate 620 to the second seal support surface 454 of the rotor output flange 290. The inner seal 640 may extend around the rotor output flange 290 and may help separate the second lubricant chamber 1002 from the air chamber 1004. The inner seal 640 may be spaced apart from the seal mounting ring 1010. As such, various components such as the spigot bearing assembly 410, the rotary disc 466, and the resolver 600 may be axially positioned between the second seal 1014 and the inner seal 640.

Control

Referring to FIG. 23, a schematic representation of an axle system 1100 is shown. The axle system 1100 may include the axle assembly 10 as well as a control system 1102.

The control system 1102 may include multiple electronic controllers. For example, the control system 1102 may include an axle controller 1110 and a brake controller 1112. Other electronic controllers may also be provided but are not depicted. One or more controllers may communicate over a Controller Area Network (CAN) bus of a vehicle. Information that is communicated over the CAN bus or through multiple controllers may have latency issues and may be slower than direct communication.

The axle controller 1110 may control operation of the axle assembly 10. The axle controller 1110 may receive signals from various sensors, such as the resolver 600, a first speed sensor 1120, and a second speed sensor 1122. In addition, the axle controller 1110 may control the actuator 906 and thereby controls movement of the shift collar 904.

The first speed sensor 1120 may provide a first signal that may be indicative of a rotational speed of a wheel 14. The first speed sensor 1120 may be located downstream from the gear reduction module 26. In at least one configuration, the first speed sensor 1120 may be disposed between the differential assembly 30 and a wheel 14. In such a configuration, the first speed sensor 1120 may detect rotation of a wheel 14, wheel hub 16, or axle shaft 32. For instance, a tone ring 1130 that may have a plurality of teeth may be disposed on the wheel hub 16 and may rotate with the wheel hub 16 about the wheel axis 18. The first speed sensor 1120 may be disposed near the wheel 14 and may detect rotation of the tone ring 1130. A first speed sensor 1120 may be associated with each wheel 14, wheel hub 16, or axle shaft 32. Thus, two first speed sensors 1120 are shown in FIG. 23. It is also contemplated that the first speed sensor 1120 may be provided in other locations. For example, the first speed sensor 1120 may detect rotation of the drive pinion 22.

The first speed sensor 1120 may be directly electrically connected or directly hardwired to the axle controller 1110. For example, a first conductor 1140 such as a wire may extend from the first speed sensor 1120 to the axle controller 1110. Accordingly, the first signal from the first speed sensor 1120 may be provided directly from the first speed sensor 1120 to the axle controller 1110 and may not be indirectly routed to the axle controller 1110 via another controller, such as the brake controller 1112. As such, the axle controller 1110 may receive the first signal faster than if the first signal was indirectly provided and the axle controller 1110 so that the axle controller 1110 may better control shifting of the shift collar 904.

Figure 24:
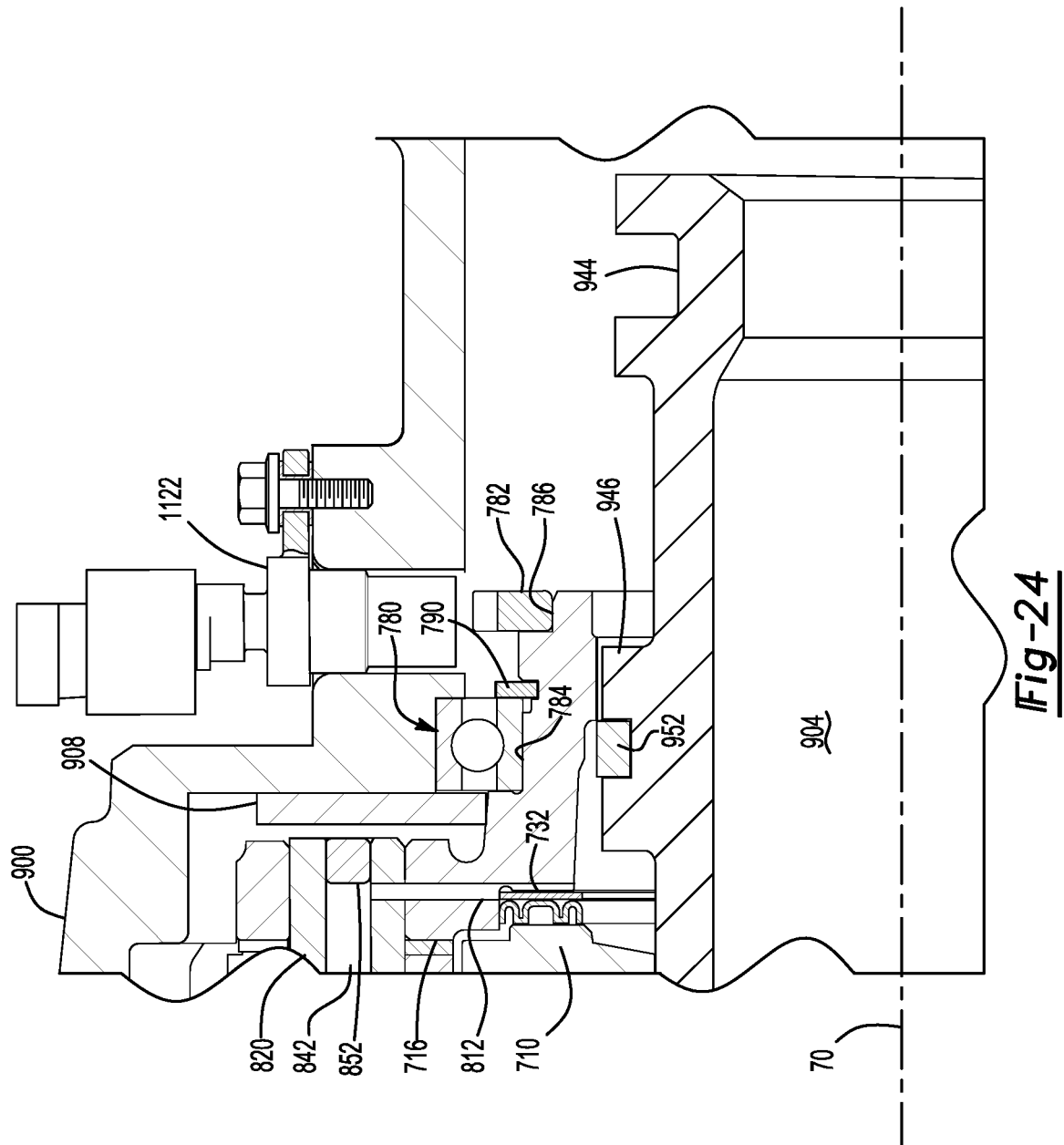
FIG. 24 is a magnified section view of a portion of the axle assembly through a tone ring that is disposed on a planet gear carrier and an associated speed sensor.

The second speed sensor 1122 may provide a second signal that may be indicative of a rotational speed of the gear reduction module 26. The second speed sensor 1122 may be located upstream from the shift collar 904. In at least one configuration, the second speed sensor 1122 may be disposed between the electric motor module 24 and the shift collar 904. In such a configuration, the second speed sensor 1122 may detect rotation of a component of the planetary gear set 700, such as the planet gear carrier 716. For instance, the second speed sensor 1122 may be mounted to the shift mechanism housing 900 or extend through a hole in the shift mechanism housing 900 as is best shown in FIG. 24 and may detect rotation of the tone ring 782 that may be disposed on the planet gear carrier 716. It is also contemplated that the second speed sensor 1122 may be provided in other locations. For example, the second speed sensor 1122 may detect rotation of the sun gear 710.

The second speed sensor 1122 may be directly electrically connected or directly hardwired to the axle controller 1110. For example, a second conductor 1142 such as a wire may extend from the second speed sensor 1122 to the axle controller 1110. Accordingly, the second signal from the second speed sensor 1122 may be provided directly from the second speed sensor 1122 to the axle controller 1110 and may not be indirectly routed to the axle controller 1110 via another controller, such as the brake controller 1112. As such, the axle controller 1110 may receive the second signal faster than if the second signal was indirectly provided and the axle controller 1110 so that the axle controller 1110 may better control shifting of the shift collar 904.

A third speed sensor 1150 may be provided with the axle system 1100. The third speed sensor 1150 may function like the first speed sensor 1120 and may detect rotation of the tone ring 1130. The third speed sensor 1150 may provide a third signal that may be used by other controllers of the control system 1102. For instance, the third signal may be provided to the brake controller 1112 to facilitate control of an antilock brake system. The third signal may not be provided to the axle controller 1110 to control shifting of the shift collar 904 due to potential latency issues.

The axle controller 1110 may use the first signal and the second signal to determine when a shift of the shift collar 904 may be executed. For instance, the axle controller 1110 may use the first signal and the second signal to determine when the rotational speed of the shift collar 904 is sufficiently close to the rotational speed of a component of the planetary gear set 700, such as the sun gear 710 and/or the planet gear carrier 716 to permit the shift collar 904 to be shifted to or from the neutral position. The axle controller 1110 operate the actuator 906 to move the shift collar 904 to a desired position when shifting of the shift collar 904 may be executed and completed.

As an example that starts with the shift collar 904 and the first position or the third position, the axle controller 1110 may determine when the first and second signals are indicative of sufficiently close rotational speeds. The axle controller 1110 may then temporarily relieve or reduced torque on the shift collar 904 by controlling the rotational speed of the rotor 206 or reducing power provided from an electrical power source/inverter 1160 to permit the shift collar 904 to be more easily be actuated from the first position or the third position to the second (neutral) position. The axle controller 1110 may then operate the actuator 906 to move the shift collar 904 to the second position.

The axle controller 1110 may move the shift collar 904 from the second position to either the first position or the third position by controlling the rotational speed of the rotor 206 to synchronize the rotational speed of the shift collar 904 with the sun gear 710 to allow the shift collar 904 to move to the second position to the first position or may synchronize the rotational speed of the shift collar 904 with the planet gear carrier 716 to allow the shift collar 904 to move from the neutral position to the third position Differential Assembly and Axle Shafts Referring to FIG. 2, the differential assembly 30 may be at least partially received in the center portion 50 of the housing assembly 20. The differential assembly 30 may transmit torque to the wheels 14 and permit the wheels 14 to rotate at different velocities. The differential assembly 30 may be operatively connected to the axle shafts 32 and may permit the axle shafts 32 to rotate at different rotational speeds in a manner known by those skilled in the art. As such, the differential assembly 30 may receive torque via the ring gear 110 and provide torque to the axle shafts 32.

Referring to FIGS. 1, 2 and 23, the axle shafts 32 may transmit torque from the differential assembly 30 to corresponding wheel hubs 16 and wheels 14. For example, two axle shafts 32 may be provided such that each axle shaft 32 extends through a different arm portion 52 of axle housing 40. The axle shafts 32 may extend along and may be rotated about the wheel axis 18 by the differential assembly 30. Each axle shaft 32 may have a first end and a second end. The first end may be operatively connected to the differential assembly 30. The second end may be disposed opposite the first end and may be operatively connected to a wheel 14. Optionally, gear reduction may be provided between an axle shaft 32 and a wheel 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a differential carrier;
    a rotor that is rotatable about an axis with respect to the differential carrier;
    a first rotor bearing assembly and a second rotor bearing assembly that are disposed on the differential carrier and rotatably support the rotor; and
    a rotor bearing preload module that is disposed between the first rotor bearing assembly and the second rotor bearing assembly, wherein the rotor bearing preload module includes a biasing member that biases the first rotor bearing assembly away from the second rotor bearing assembly.

2. The axle assembly of claim 1 wherein the differential carrier has a bearing support wall that extends around the axis, and the first rotor bearing assembly, the second rotor bearing assembly, and the rotor bearing preload module receive and extend around the bearing support wall.

3. The axle assembly of claim 1 wherein the rotor bearing preload module includes a first bearing preload ring that extends from the first rotor bearing assembly and a second bearing preload ring that extends from the second rotor bearing assembly, wherein the biasing member is disposed between the first bearing preload ring and the second bearing preload ring.

4. The axle assembly of claim 3 wherein the biasing member biases the first bearing preload ring in an axial direction away from the second bearing preload ring.

5. The axle assembly of claim 3 wherein the first bearing preload ring engages an inner race of the first rotor bearing assembly and is spaced apart from an outer race of the first rotor bearing assembly.

6. The axle assembly of claim 5 further comprising a first retaining member that is coupled to the rotor and that engages the outer race of the first rotor bearing assembly to inhibit axial movement of the outer race.

7. The axle assembly of claim 3 wherein the second bearing preload ring engages an inner race of the second rotor bearing assembly and is spaced apart from an outer race of the second rotor bearing assembly.

8. The axle assembly of claim 7 further comprising a second retaining member that is coupled to the differential carrier, disposed opposite the second bearing preload ring, and that engages the inner race of the second rotor bearing assembly to inhibit axial movement of the inner race.

9. The axle assembly of claim 8 further comprising a rotor output flange that is fixedly mounted to the rotor, wherein the rotor output flange has a protrusion that engages the outer race of the second rotor bearing assembly to inhibit axial movement of the outer race away from the first rotor bearing assembly.

10. The axle assembly of claim 9 wherein the protrusion is received inside the rotor and extends around the axis and the second retaining member.

11. The axle assembly of claim 3 wherein the biasing member extends around the second bearing preload ring.

12. The axle assembly of claim 11 wherein the biasing member is a wave spring.

13. An axle assembly comprising:
   a differential carrier;
   a rotor that is rotatable about an axis with respect to the differential carrier;
   a first rotor bearing assembly and a second rotor bearing assembly that receive the differential carrier and rotatably support the rotor; and
   a rotor bearing preload module that is disposed between the first rotor bearing assembly and the second rotor bearing assembly, wherein the rotor bearing preload module includes:
      a first bearing preload ring that extends from the first rotor bearing assembly and is moveable in an axial direction;
      a second bearing preload ring that extends from the second rotor bearing assembly; and
      a biasing member that is disposed between the first bearing preload ring and the second bearing preload ring that biases the first rotor bearing assembly away from the second rotor bearing assembly.

14. The axle assembly of claim 13 wherein the first bearing preload ring has a center portion that engages the differential carrier, a first side portion that extends from the center portion to the first rotor bearing assembly, and a second side portion that is disposed opposite the first side portion and extends from the center portion toward the second rotor bearing assembly, wherein the first side portion and the second side portion are spaced apart from the differential carrier.

15. The axle assembly of claim 14 wherein the center portion has a center portion inner surface that faces toward the axis and engages the differential carrier and the first side portion extends from an inner race of the first rotor bearing assembly and has a first inner surface that faces toward the axis and is spaced apart from the differential carrier.

16. The axle assembly of claim 14 wherein the second bearing preload ring is received in the second side portion of the first bearing preload ring.

17. The axle assembly of claim 14 wherein the second bearing preload ring has a bearing contact portion that engages an inner race of the second rotor bearing assembly and a guide portion that extends from the bearing contact portion toward the first rotor bearing assembly, wherein the bearing contact portion has a smaller diameter than the guide portion.

18. The axle assembly of claim 17 wherein the biasing member extends from the guide portion to the second side portion of the first bearing preload ring and the guide portion is spaced apart from the center portion of the first bearing preload ring.

19. An axle assembly comprising:
   a differential carrier;
   a rotor that is rotatable about an axis with respect to the differential carrier;
   a first rotor bearing assembly and a second rotor bearing assembly that receive the differential carrier and rotatably support the rotor; and
   a rotor bearing preload module that is disposed between the first rotor bearing assembly and the second rotor bearing assembly, wherein the rotor bearing preload module includes:
      a first bearing preload ring that extends from the first rotor bearing assembly and is moveable in an axial direction;
      a second bearing preload ring that extends from the second rotor bearing assembly; and
      a biasing member that is disposed between the first bearing preload ring and the second bearing preload ring that biases the first rotor bearing assembly away from the second rotor bearing assembly, wherein the differential carrier has a bearing support wall that extends around the axis and that has a first circumferential surface, a second circumferential surface, and a third circumferential surface, wherein the first rotor bearing assembly engages the first circumferential surface, the second rotor bearing assembly engages the third circumferential surface, the first bearing preload ring and the second bearing preload ring engage the second circumferential surface, and the second circumferential surface has a smaller diameter than the first circumferential surface and a larger diameter than the third circumferential surface.

20. The axle assembly of claim 19 wherein the second bearing preload ring engages the third circumferential surface.

21. An axle assembly comprising:
   a differential carrier;
   a rotor that is rotatable about an axis with respect to the differential carrier;
   a first rotor bearing assembly and a second rotor bearing assembly that are disposed on the differential carrier and rotatably support the rotor; and
   a rotor bearing preload module that is disposed between the first rotor bearing assembly and the second rotor bearing assembly, wherein the rotor bearing preload module includes a biasing member that biases the first rotor bearing assembly away from the second rotor bearing assembly; and
   a rotor output flange that is fixedly mounted to the rotor, wherein the rotor output flange has a protrusion that engages an outer race of the second rotor bearing assembly to inhibit axial movement of the outer race away from the first rotor bearing assembly.

22. An axle assembly comprising:
   a differential carrier;
   a rotor that is rotatable about an axis with respect to the differential carrier;
   a first rotor bearing assembly and a second rotor bearing assembly that receive the differential carrier and rotatably support the rotor; and a rotor bearing preload module that is disposed between the first rotor bearing assembly and the second rotor bearing assembly, wherein the rotor bearing preload module includes:
a first bearing preload ring that extends from the first rotor bearing assembly and is moveable in an axial direction;
a second bearing preload ring that extends from the second rotor bearing assembly; and
a biasing member that is disposed between the first bearing preload ring and the second bearing preload ring that biases the first rotor bearing assembly away from the second rotor bearing assembly, wherein the first bearing preload ring has a center portion that engages the differential carrier, a first side portion that extends from the center portion to the first rotor bearing assembly, and a second side portion that is disposed opposite the first side portion and extends from the center portion toward the second rotor bearing assembly, wherein the first side portion and the second side portion are spaced apart from the differential carrier.

* * * * *